(12) United States Patent
Sumioka

(10) Patent No.: US 11,696,030 B2
(45) Date of Patent: Jul. 4, 2023

(54) VIBRATION TYPE ACTUATOR CONTROL APPARATUS, VIBRATION TYPE DRIVING APPARATUS HAVING THE SAME, INTERCHANGEABLE LENS, IMAGING APPARATUS, AND AUTOMATIC STAGE

(71) Applicant: CANON KABUSHIKI KAISHA, Tokyo (JP)

(72) Inventor: Jun Sumioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/669,250

(22) Filed: Feb. 10, 2022

(65) Prior Publication Data
US 2022/0286614 A1 Sep. 8, 2022

(30) Foreign Application Priority Data
Mar. 3, 2021 (JP) ................. 2021-033662

(51) Int. Cl.
*H04N 5/232* (2006.01)
*H04N 23/68* (2023.01)
*H02N 2/00* (2006.01)
*G06N 20/00* (2019.01)

(52) U.S. Cl.
CPC ......... *H04N 23/687* (2023.01); *H02N 2/0045* (2013.01); *G06N 20/00* (2019.01)

(58) Field of Classification Search
CPC ...... H04N 23/67; H04N 23/68; H02N 2/0045; G03B 2205/0061; G06N 20/00

USPC .............................. 348/208.99, 345
See application file for complete search history.

(56) References Cited

U.S. PATENT DOCUMENTS
2017/0093304 A1* 3/2017 Sumioka .............. H02N 2/0015

FOREIGN PATENT DOCUMENTS
JP 2016144262 A 8/2016

* cited by examiner

*Primary Examiner* — Anthony J Daniels
(74) *Attorney, Agent, or Firm* — Canon U.S.A., Inc. I.P. Division

(57) ABSTRACT

A vibration type actuator control apparatus, which uses a vibration from a vibrator to move a contact member, includes a control unit and a drive unit. The control unit includes first and second learned models, each having a neural network, and outputs control amounts for the drive unit to move the contact member. When a contact member moving target velocity is input, the first learned model outputs a first control amount as one of the control amounts. When a positional deviation is input, the second learned model outputs a second control amount as one of the control amounts. The drive unit moves the contact member using a value based on the first and second control amounts. The positional deviation is in association with a difference between a target position for moving the contact member and a detected position detected when the contact member is moved relative to the vibrator.

24 Claims, 20 Drawing Sheets

LAYER H SIGMOID FUNCTION

LAYER Z LINEAR FUNCTION

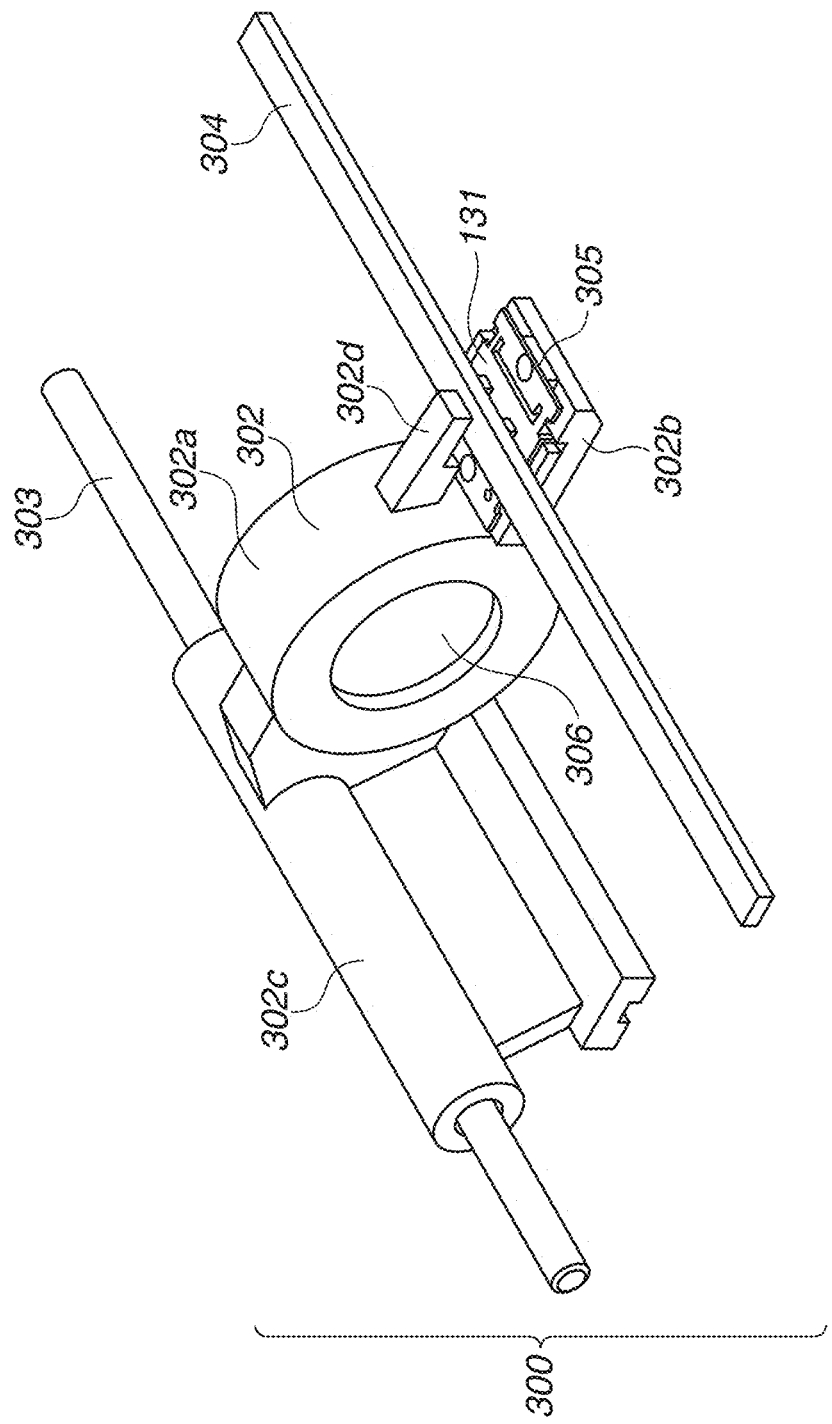

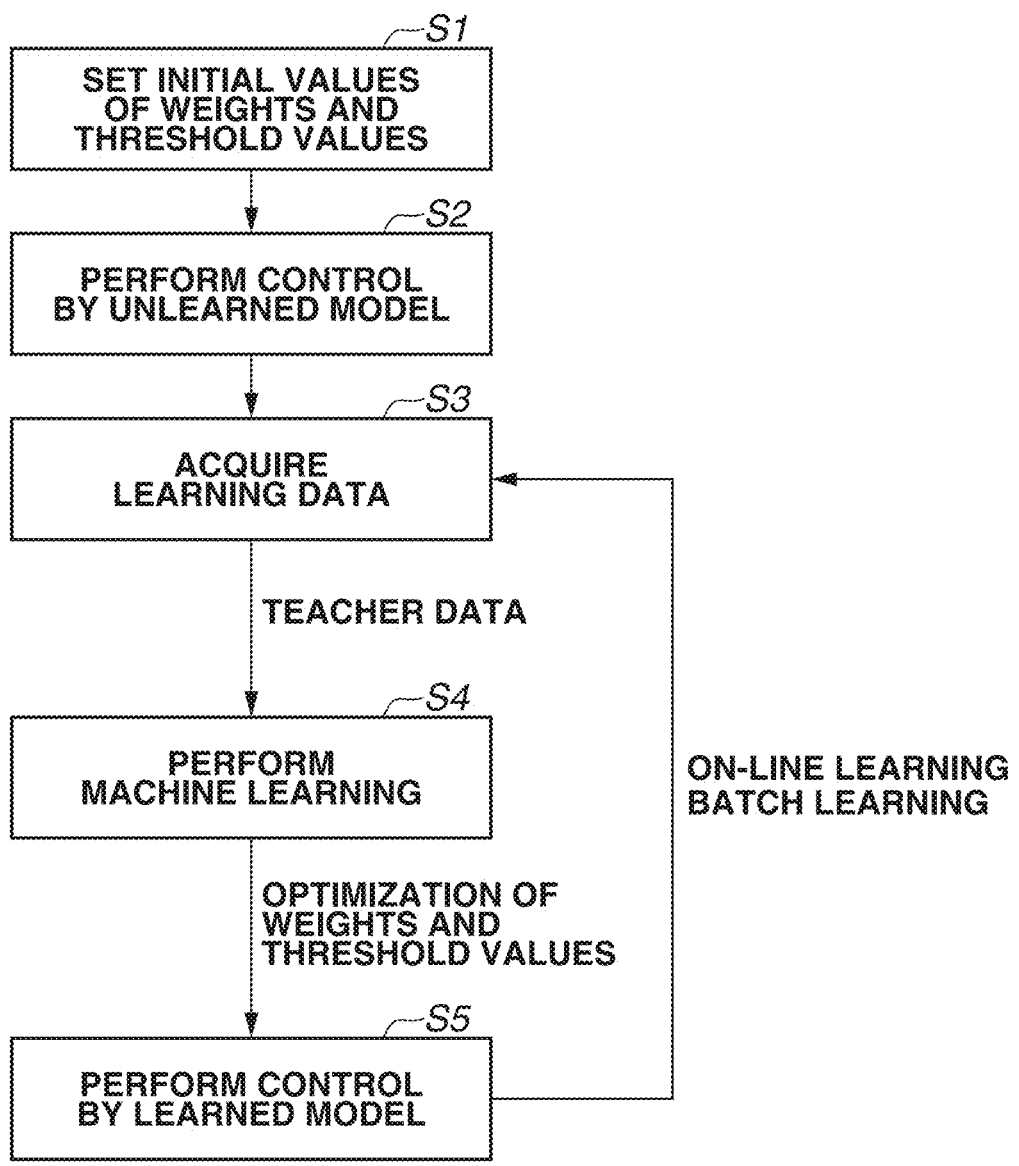

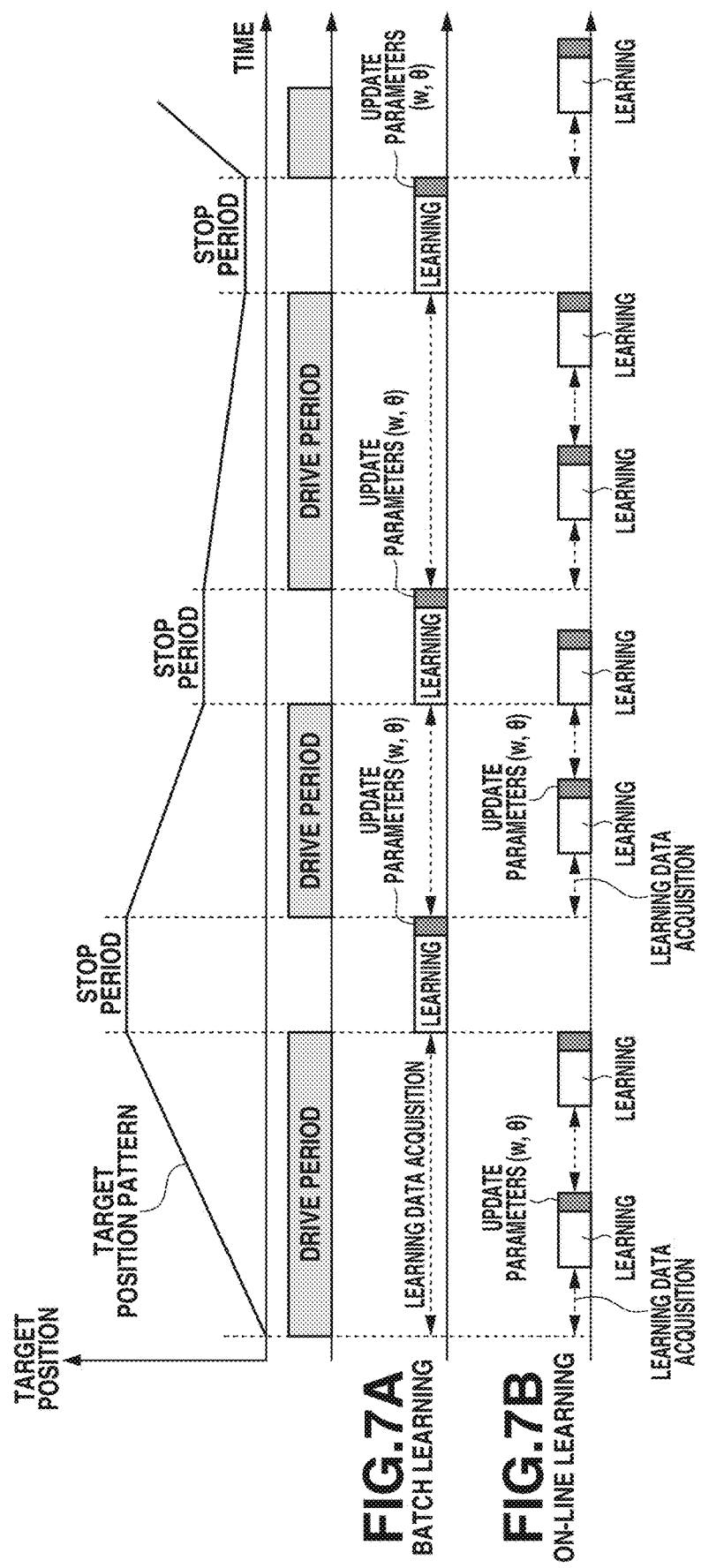
FIG.7A BATCH LEARNING
FIG.7B ON-LINE LEARNING

Adam OPERATION RESULT

LEARNING DATA

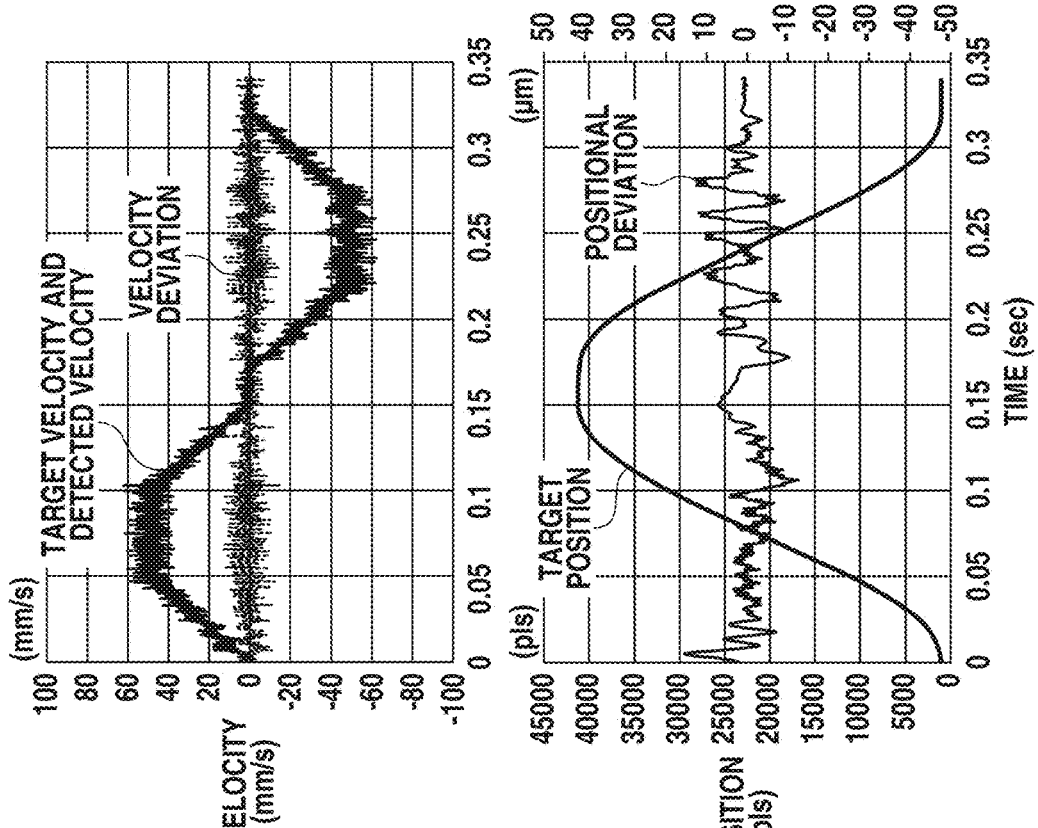
FIG.10A COMPARATIVE EXAMPLE (PID CONTROL)
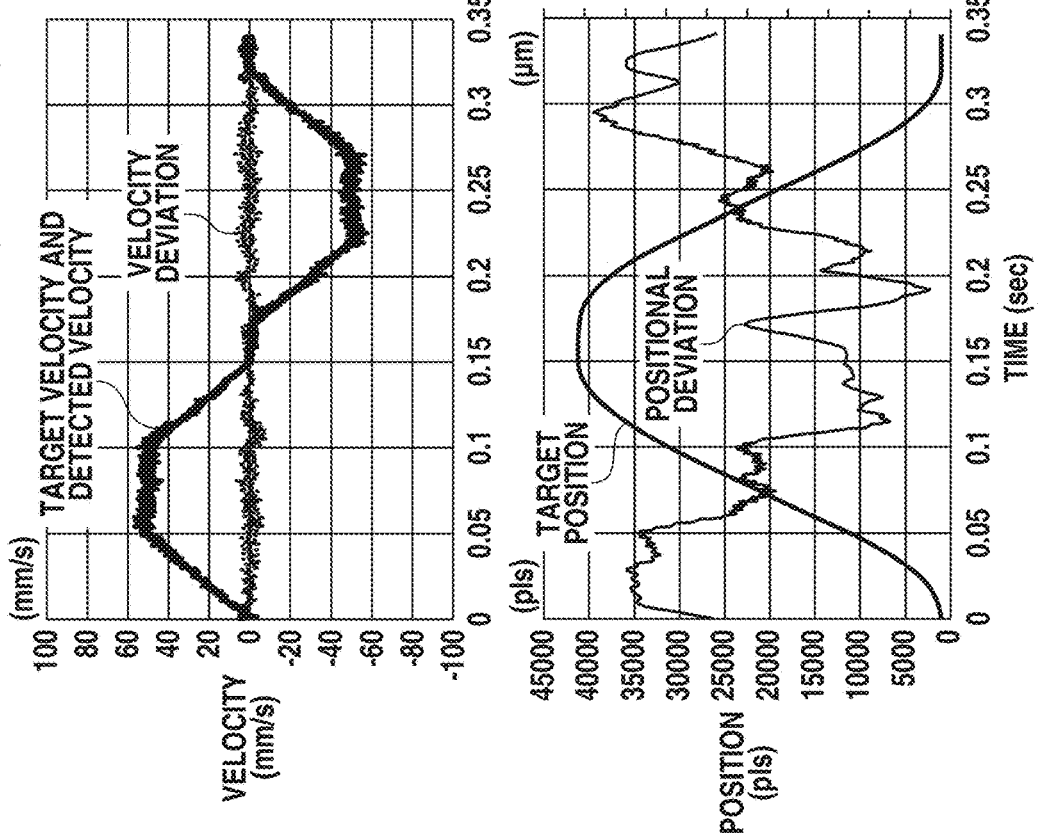
FIG.10B PRESENT EMBODIMENT

CONTROL BY PHASE DIFFERENCE AND FREQUENCY

CONTROL BY PULSE WIDTH AND FREQUENCY

VIBRATION TYPE ACTUATOR CONTROL APPARATUS, VIBRATION TYPE DRIVING APPARATUS HAVING THE SAME, INTERCHANGEABLE LENS, IMAGING APPARATUS, AND AUTOMATIC STAGE

BACKGROUND

Field

The present disclosure relates to a vibration type actuator control apparatus, a vibration type driving apparatus having the same, an interchangeable lens, an imaging apparatus, and an automatic stage.

Description of the Related Art

A vibration type motor as an example of a vibration type actuator will now be described. A vibration type motor is a non-electromagnetic drive motor. More specifically, the electro-mechanical energy converter generates a high-frequency vibration when an electro-mechanical energy converter, such as a piezoelectric element bonded to an elastic member, is applied with an alternating-current (AC) voltage, and takes out vibration energy of the electro-mechanical energy converter as a continuous mechanical movement.

A vibration type motor has excellent motor features, such as compact size, light weight, high accuracy, and high torque at low-speed drive in comparison with an electromagnetic drive motor. However, a vibration type motor has non-linear motor characteristics and therefore is hard to be modeled. Moreover, since controllability of a vibration type motor changes according to drive conditions or temperature environment, a control system needs to be devised. A vibration type motor has many control parameters including the frequency, phase difference, and voltage, and the adjustment of these control parameters is complicated.

FIG. 20A is a control block diagram illustrating a conventional common vibration type driving apparatus based on proportional-integral-derivative (PID) control (refer to Japanese Patent Application Laid-Open No. 2016-144262). A 2-phase AC voltage (AC signal) is output from a drive circuit to which a control amount is input described below. The actual velocity (detected velocity) of a vibration type motor (vibration type actuator) can be controlled by controlling the frequency (1/period), phase difference, and voltage amplitude (refer to FIG. 20B) of the 2-phase AC voltage that are output from the drive circuit. The voltage amplitude is variable by using the pulse width signal input to the drive circuit from a PID controller (described below). FIG. 20B (1), (2), and (3) illustrate the period, phase difference, and voltage amplitude of the 2-phase AC voltage, respectively, output from the drive circuit.

A positional deviation is input into the PID controller (control amount output unit): the positional deviation is a difference between the target position of the vibration type motor specified by a position instruction unit and the actual position (detected position) of the vibration type motor detected by a position detection unit. Then, control amounts successively output from the PID controller at control sampling intervals are input into the drive circuit. The control amounts (frequency, phase difference, and pulse width) have been subjected to the PID operation according to the positional deviation input to the PID controller.

Position feedback control is then performed based on the control amounts. Hereinafter, the control sampling interval is also simply referred to as a "sampling interval".

FIG. 20C schematically illustrates the frequency vs. velocity characteristics of the vibration type actuator. More specifically, FIG. 20C illustrates a high velocity and a large gradient of the frequency vs. velocity characteristics at a frequency (f1) in the high-velocity region (low-frequency range), and a low velocity and a small gradient of the frequency vs. velocity characteristics at a frequency (f2) in the low-velocity region (high-frequency range). A vibration type actuator provides different control performance (frequency vs. velocity characteristics and phase difference vs. velocity characteristics) for each velocity region to be used, making it hard to adjust the PID control gain. FIG. 20D schematically illustrates the phase difference vs. velocity characteristics of the vibration type actuator. More specifically, FIG. 20D illustrates a high velocity and a large gradient of the phase difference vs. velocity characteristics at the frequency (f1) in the high-velocity region (low-frequency range), and a low velocity and a small gradient of the phase difference vs. velocity characteristics at the frequency (f2) in the low-velocity region (high-frequency range).

A vibration type actuator provides different control performances (frequency vs. velocity characteristics and phase difference vs. velocity characteristics) for each velocity region to be used, making it hard to adjust the PID control gain. FIG. 20D schematically illustrates the phase difference vs. velocity characteristics of the vibration type actuator. More specifically, FIG. 20D illustrates a high velocity and a large gradient of the phase difference vs. velocity characteristics at the frequency (f1) in the high-velocity region (low-frequency range), and a low velocity and a small gradient of the phase difference vs. velocity characteristics at the frequency (f2) in the low-velocity region (high-frequency range).

When the ambient temperature changes, for example, when the temperature changes from a normal temperature to a low temperature, the resonance frequency shifts from the low-frequency side to the high-frequency side based on the temperature characteristics of the piezoelectric element. In this case, the control performance also changes by the ambient temperature because the velocity in association with the same drive frequency, and the gradient of the frequency vs. velocity characteristics in association with the drive frequency are different before and after the resonance frequency shifts from the low-frequency side to the high-frequency side.

Since the velocity and the gradient are different for each individual vibration type motor, the control performance also changes on an individual basis.

Further, the control performance also changes by change over time. In designing, it is necessary to adjust the PID control gain (proportional gain, integral gain, and differential gain in PID control) in consideration of all of these change factors to ensure a gain margin and a phase margin. There has been a demand for a vibration type actuator control apparatus having a control amount output unit different from the conventional PID controller, as a main control amount output unit.

SUMMARY

The present disclosure is directed to providing a vibration type actuator control apparatus having a control amount output unit different from a conventional proportional-integral-derivative (PID) controller, as a main control amount output unit.

According to an aspect of the present disclosure, a vibration type actuator control apparatus configured to move, by using a vibration produced in a vibrator, a contact member in contact with the vibrator relative to the vibrator includes a control unit including a first learned model and a second learned model each having a neural network including an input layer, a hidden layer, and an output layer, and a drive unit configured to move the contact member in contact with the vibrator relative to the vibrator by using control amounts output from the control unit, wherein, in a case where a target velocity for moving the contact member relative to the vibrator is input, the first learned model is configured to output a first control amount for moving the contact member relative to the vibrator, wherein, in a case where a positional deviation for moving the contact member relative to the vibrator is input, the second learned model is configured to output a second control amount for moving the contact member relative to the vibrator, wherein the drive unit is configured to move the contact member relative to the vibrator by using a value based on the first control amount and the second control amount, and wherein the positional deviation is a value in association with a difference between a target position for moving the contact member relatively to the vibrator and a detected position detected when the contact member is moved relatively to the vibrator.

Further features of the present disclosure will become apparent from the following description of exemplary embodiments with reference to the attached drawings.

BRIEF DESCRIPTION OF THE DRAWINGS

FIG. 5 illustrates a lens drive mechanism of a lens barrel.

FIG. 6 is a flowchart of control by machine learning and a learned model according to the first exemplary embodiment of the present disclosure.

FIGS. 7A and 7B are timing charts illustrating batch learning and on-line learning, respectively, in the machine learning unit.

FIGS. 10A and 10B illustrate results of feedback control for the vibration type actuator based on a predetermined target position pattern by the control apparatus according to an embodiment of the present disclosure.

DESCRIPTION OF THE EMBODIMENTS

Figure 1:
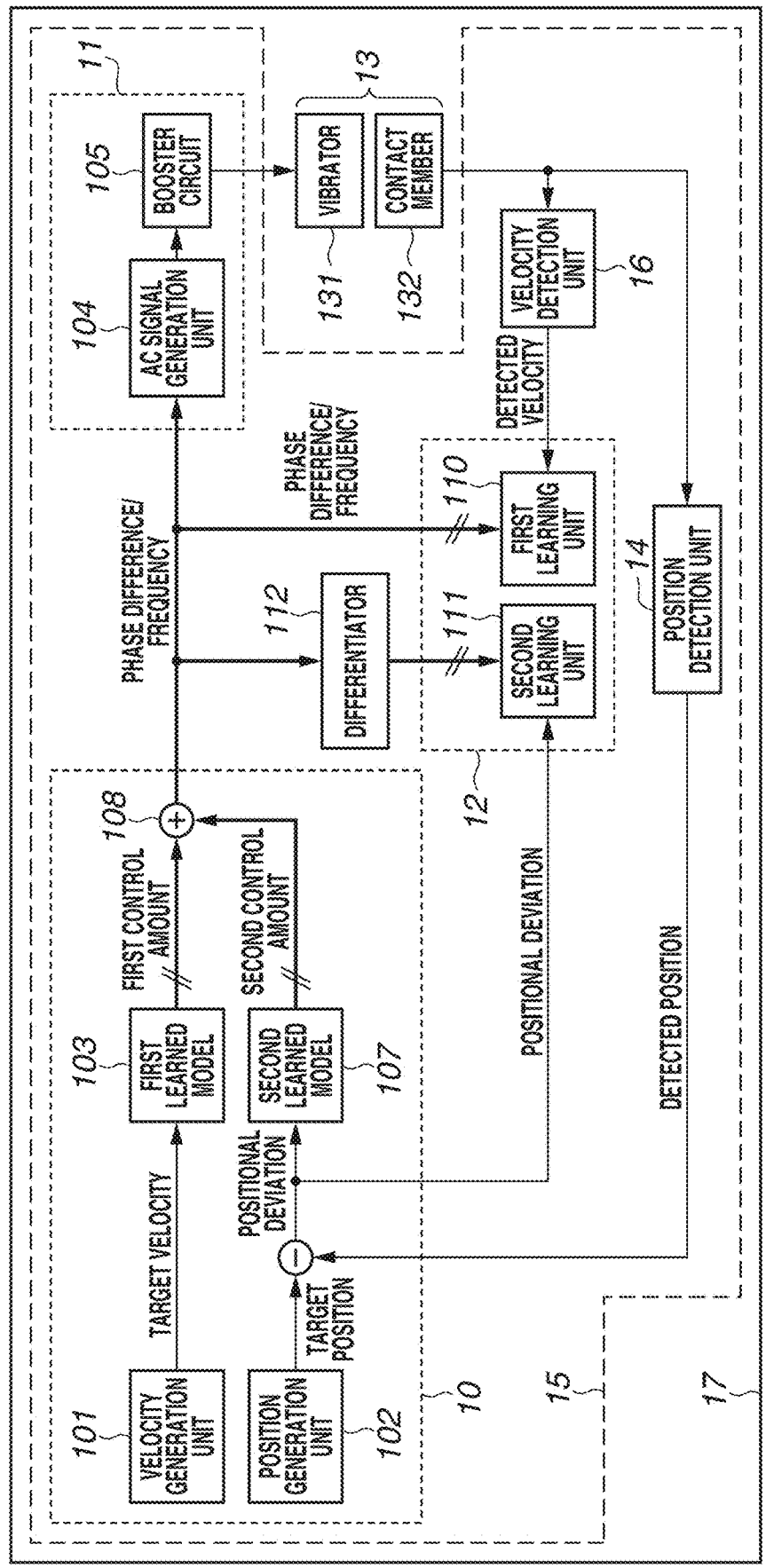
FIG. 1 illustrates a block diagram of a vibration type actuator control apparatus according to a first exemplary embodiment of the present disclosure.

FIG. 1 is a control block diagram illustrating a vibration type actuator according to a first exemplary embodiment. A vibration type driving apparatus 17 includes a control apparatus 15 and a vibration type motor 13 (vibration type actuator). Referring to FIG. 1, excluding the vibration type actuator 13 from the vibration type driving apparatus 17 forms the control apparatus 15.

The control apparatus 15 includes a control unit 10 that controls the vibration type actuator 13, a machine learning unit 12 that generates a learned model, and a drive unit 11. The control apparatus 15 includes a position detection unit 14 that detects the position (relative position) of a contact member 132 relative to a vibrator 131, and a velocity detection unit 16 that detects the velocity (relative velocity) of the contact member 132 relative to the vibrator 131. In the following descriptions, the relative position detected by the position detection unit 14 is also referred to as a detected position. In the following descriptions, the relative velocity detected by the velocity detection unit 16 is also referred to as a detected velocity. Although an absolute encoder or an increment encoder is used as the position detection unit 14, the position detection unit 14 is not limited thereto. The velocity detection unit 16 is not limited to a device (velocity sensor) that directly detects velocity information. The velocity detection unit 16 may be a device that indirectly detects velocity information, for example, a device that detects velocity information by calculating positional information.

The control unit 10 is configured to add control amounts output by two different learned models to generate a signal for controlling the drive of the vibrator 131 (the movement of the contact member 132 relative to the vibrator 131). More specifically, the target velocity and the positional deviation of the vibration type actuator 13 are separately input to the learned models, and the output phase difference and frequency are used as control amounts. The target velocity refers to a velocity set to be followed by the actual velocity (detected velocity) when the contact member 132 is moved relatively to the vibrator 131. The positional deviation refers to the difference between the target position and the actual position (detected position). The target position refers to a position set to be followed by the actual position (detected position) when the contact member 132 is moved relative to the vibrator 131. A pulse width for changing the voltage amplitude may be used as a control amount.

The control unit 10 is configured to generate a signal for controlling the drive of the vibrator 131 (a relative movement of the contact member 132 with respect to the vibrator 131). More specifically, the target velocity and the positional deviation are input to the learned models, and the output phase difference and frequency are used as control amounts of the vibration type actuator 13. The target velocity refers to a velocity set to be followed by the actual velocity (detected velocity) when the contact member 132 is moved relatively to the vibrator 131. The positional deviation refers to the difference between the target position and the actual position (detected position). The target position refers to a position set to be followed by the actual position (detected position) when the contact member 132 is moved relatively to the vibrator 131. A pulse width for changing the voltage amplitude may be used as a control amount.

The control unit 10 includes a velocity generation unit 101 that generates a target velocity, and a position generation unit 102 that generates a target position. The control unit 10 also includes a control amount output unit including a first learned model 103 to which the target velocity is input and from which the phase difference and frequency are output. The control unit 10 also includes a control amount output unit including a second learned model 107 to which the positional deviation is input and from which the phase difference and frequency are output. In the following descriptions, a "control amount output unit including a learned model" is also simply referred to as a "learned model". The control unit 10 also includes an adder 108 that adds the output from the first learned model 103 and the output from the second learned model 107.

The drive unit 11 includes an AC signal generation unit 104 and a booster circuit 105.

The velocity generation unit 101 generates a target velocity of a relative velocity between the vibrator 131 and the contact member 132 for each unit time. The target position of the relative position for each unit time is generated by the position generation unit 102. The value in association with the difference between the detected position detected by the position detection unit 14 and the target position is calculated as a positional deviation (shift amount).

For example, the target velocity is output from the velocity generation unit 101 at control sampling intervals as a unit time. For example, the target position is output from the position generation unit 102 at control sampling intervals as a unit time. More specifically, one command value representing the target velocity is output from the velocity generation unit 101 at control sampling intervals, and one command value representing the target position is output from the position generation unit 102 at control sampling intervals. The command value may be a value associated with the target velocity instead of the target velocity itself. The "velocity generation unit 101" outputs a command value (issues a target velocity instruction) and therefore may also be referred to as a "velocity instruction unit 101". The "position generation unit 102" outputs a command value (issues a target position instruction) and therefore may also be referred to as a "position instruction unit 102".

The control sampling interval refers to one cycle ranging from the acquisition of the positional deviation to the timing immediately before the next acquisition of the positional deviation, as illustrated in FIG. 1. The one cycle also includes an output of the control amount, an application of an AC voltage to the vibrator 131, and a detection of the actual velocity (detected velocity) and the actual position (detected position) between these acquisitions. In the above described cycle, the position or velocity of the vibration type actuator is subjected to feedback control.

The target velocity is given to make the vibration type actuator follow a predetermined position, and may be generated by differentiating the target position for each unit time. On the contrary, the target position may be generated by integrating the target velocity.

The target velocity is input to the first learned model 103 which then outputs a first control amount. Meanwhile, the positional deviation is input to the second learned model 107 which then outputs a second control amount. The first and the second control amounts are added by the adder 108 which then outputs the addition value to the drive unit 11 as control amounts (phase difference and frequency).

According to the present exemplary embodiment, the control amounts according to the target velocity are output from the first learned model 103. For the control deviation arising from drive conditions and temperature environment, a control amount that supplements an error is output from the second learned model 107. This enables implementing high-accuracy and high-robustness control.

The control amounts (phase difference and frequency) output from the control unit 10 are input to the AC signal generation unit 104 to be used to control the velocity and the drive direction of the vibration type actuator. The AC signal generation unit 104 generates a 2-phase AC signal based on the phase difference, frequency, and pulse width. The booster circuit 105 including, for example, a coil and a transformer boosts the AC signal to a desired drive voltage. The boosted AC signal is applied to the piezoelectric element of the vibrator 131 to drive the contact member 132.

The machine learning unit 12 performs machine learning for generating the first learned model 103 and the second learned model 107. The detected velocity detected by the velocity detection unit 16 and the control amounts (phase difference and frequency) output from the control unit 10 are input to a first learning unit 110, and are used as learning data (teacher data) for generating the first learned model 103. The positional deviation and the differential values of the control amounts (phase difference and frequency) from the control unit 10 are input to a second learning unit 111, and are used as learning data for generating the second learned model 107.

The reason why the second learning unit 111 inputs the differential values of the control amounts from the differentiator 112 is to convert the values into data correlated with the positional deviation. More specifically, the differential values represent time variations of the control amounts and therefore have an association with the behavior of the positional deviation.

The second learning unit 111 may use other learning data. For example, the parameters (weights and threshold values) of a neural network (hereinafter also referred to as "NN") learned by the first learning unit 110 can be used after being adjusted at a predetermined proportion.

Figure 2:
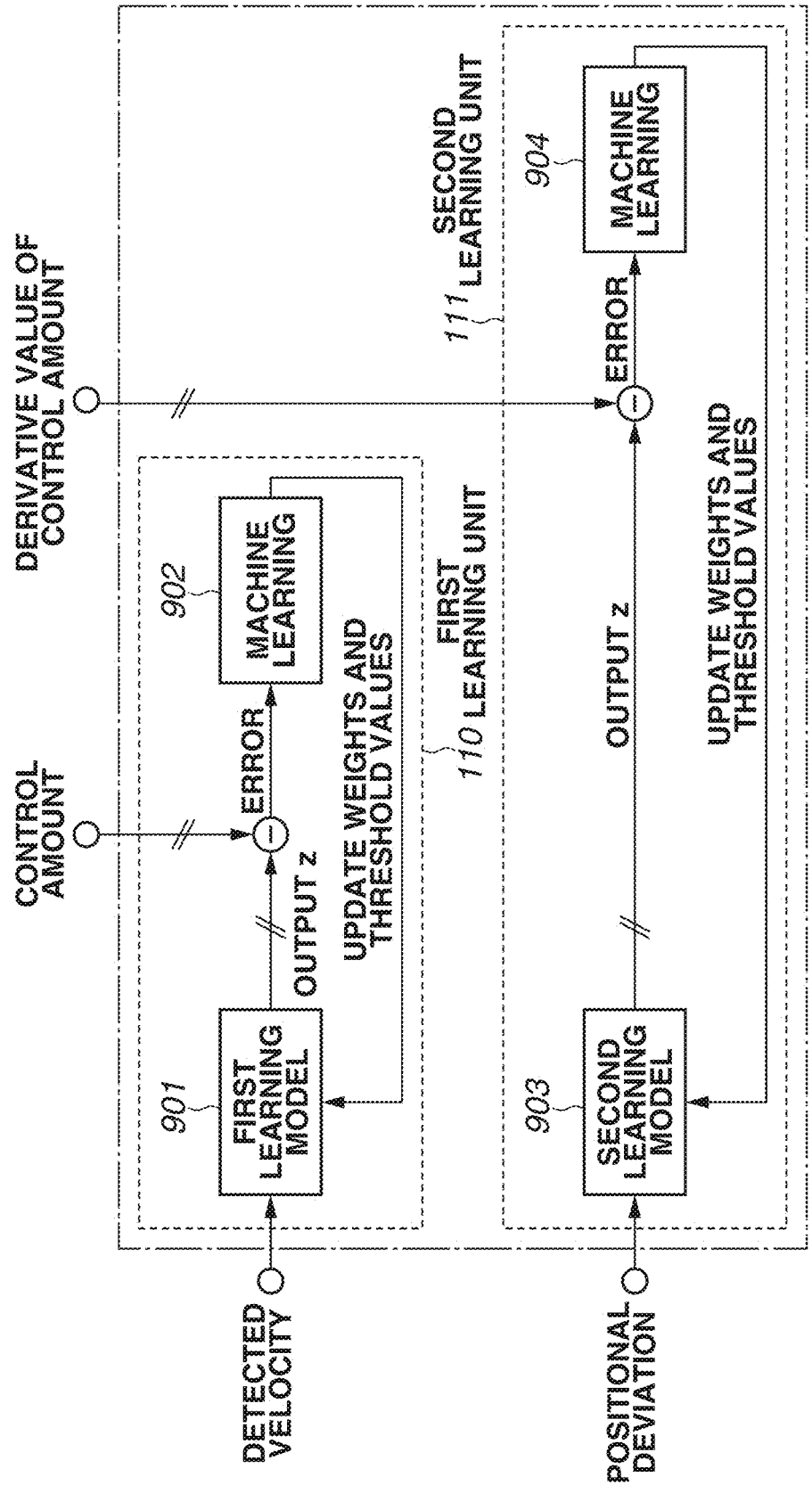
FIG. 2 is a block diagram illustrating a configuration of a machine learning unit according to the first exemplary embodiment of the present disclosure.

FIG. 2 illustrates a configuration of the machine learning unit 12 according to the present exemplary embodiment. The first learning unit 110 and the second learning unit 111 perform NN-based machine learning. The first learning unit 110 will now be described. The detection velocity is input to a first learning model (NN) 901 which then outputs z as a result of operation. An error between a control amount and the output z is calculated, and then machine learning 902 is performed. By repeating the above-described machine learning 902, the weights and threshold values of the first learning model 901 are updated to be optimized. This also applies to the second learning unit 111. The positional deviation is input to the second learning model (NN) 903 which then outputs z. An error between the differential value of a control amount and the output z is calculated, and then machine learning 904 is performed. The machine learning will be described in detail below.

Figure 3A:
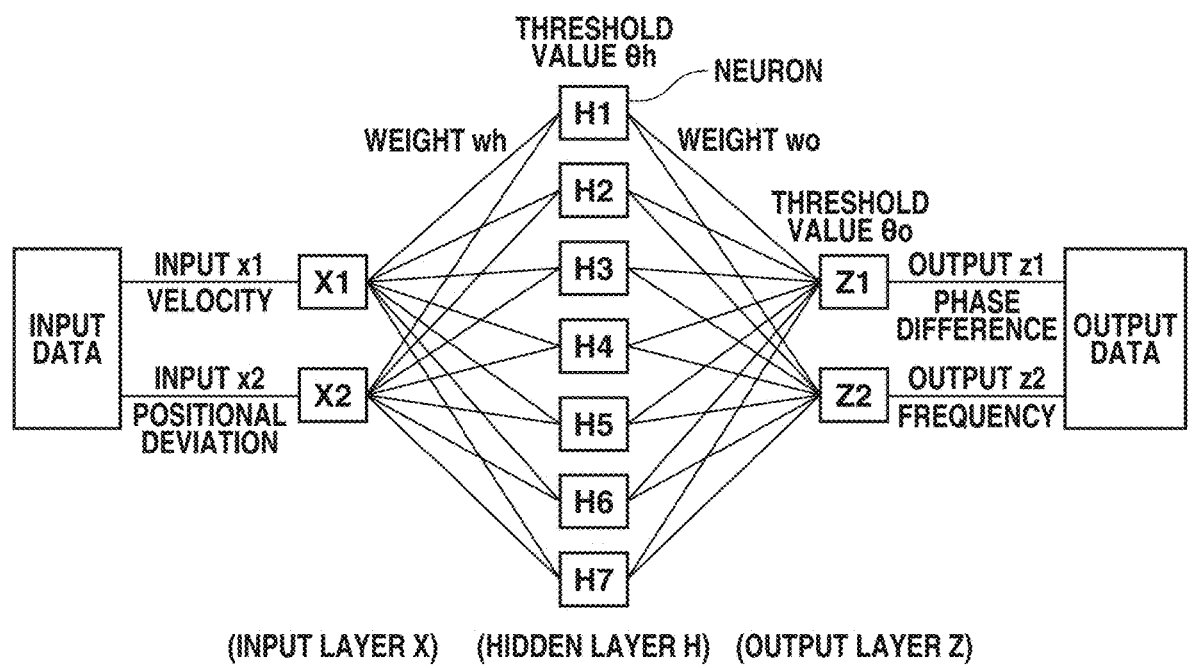
FIGS. 3A to 3C illustrate a neural network structure included in a learning model according to the first exemplary embodiment of the present disclosure has.
Figure 3B:
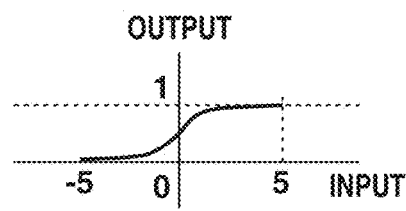
Figure 3C:
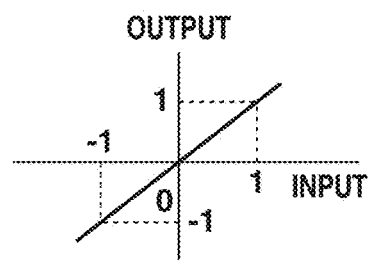

FIGS. 3A to 3C illustrate a neural network structure (hereinafter also referred to as a "NN structure") included in each learning model according to the present exemplary embodiment.

The first learned model 103 and the second learned model 107 include an NN composed of a layer X as an input layer, a layer H as a hidden layer, and a layer Z as an output layer. The first learned model 103 according to the present exemplary embodiment sets a target velocity x1 as input data, and a phase difference z1 and a frequency z2 as output data. The second learned model 107 sets a positional deviation x2 as input data, and a phase difference z1 and a frequency z2 as output data. The hidden layer is formed of seven different neurons. A common sigmoid function (see FIG. 3B) was used as an activation function. The number of neurons in the hidden layer is not limited to 7. The preferred number of neurons is, for example, 3 to 20. The smaller number of neurons provides faster learning with a lower accuracy, and the larger number of neurons provides a higher accuracy with slower learning. Typically, a sigmoid function or a ReLU (ramp function) is used as the activation function of the output layer. However, a linear function (FIG. 3C) was used to cope with the negative sign of the phase difference as a control amount.

FIG. 3A illustrates a weight wh that connects the neurons of the input and the hidden layers, a threshold value θh of the neuron of the hidden layer, a weight wo that connects the neurons of the hidden and the output layers, and a threshold value θo of the neuron of the output layer. All of the weights and threshold values are applied with values learned by the machine learning unit 12. A learned NN can be grasped as an aggregate as a result of extracting common feature patterns from time-series data of the velocity and control amounts of the vibration type actuator. The output value is obtained by a function having weights and threshold values as parameters.

Although the present exemplary embodiment applies the phase difference and frequency as control amounts, a combination of the pulse width and frequency or a combination of the pulse width and phase difference is also applicable. The output layer of the NN may include one neuron, and may be designed so that either one of the phase difference, frequency, and pulse width is selected.

An example of a vibration type actuator applicable to the present embodiment will now be described with reference to the accompanying drawings. The vibration type actuator according to the present exemplary embodiment includes a vibrator and a contact member. FIGS. 4A to 4D illustrate a drive principle of a linear drive (linear motion) vibration type actuator as an example of a vibration type actuator. The vibration type actuator 13 illustrated in FIG. 4A includes an elastic member 203, a vibrator 131, and the contact member 132 driven by the vibrator 131. The vibrator 131 includes a piezoelectric element 204 as an electro-mechanical energy converter adhesively bonded to the elastic member 203. When the piezoelectric element 204 is applied with an AC voltage, the vibrator 131 generates two different vibration modes as illustrated in FIGS. 4C and 4D, and moves the contact member 132 in pressure contact with protruding members 202 in the directions of the arrow.

Figure 4A:
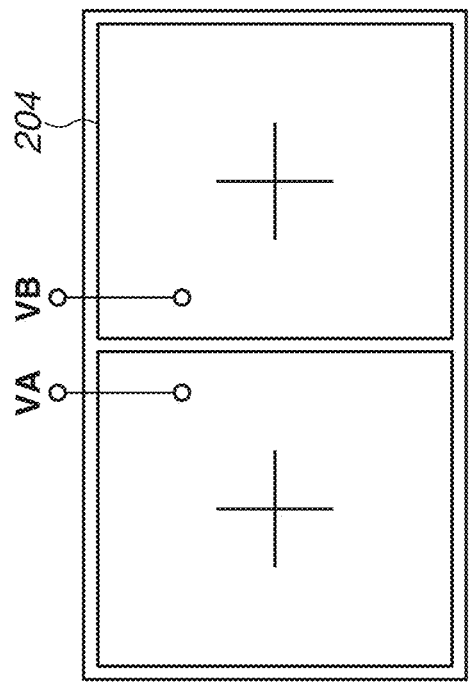
FIGS. 4A to 4D illustrate a drive principle of a linear drive vibration type actuator.
Figure 4B:
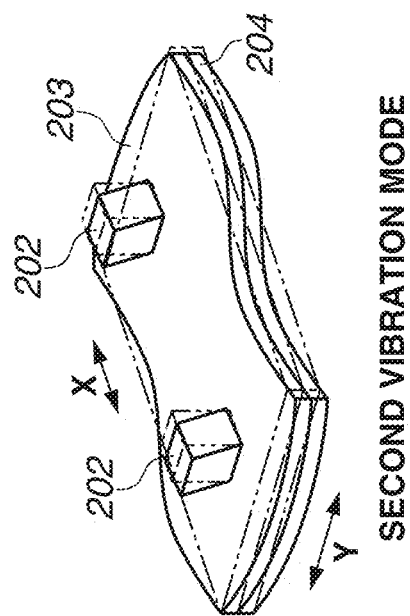
Figure 4C:
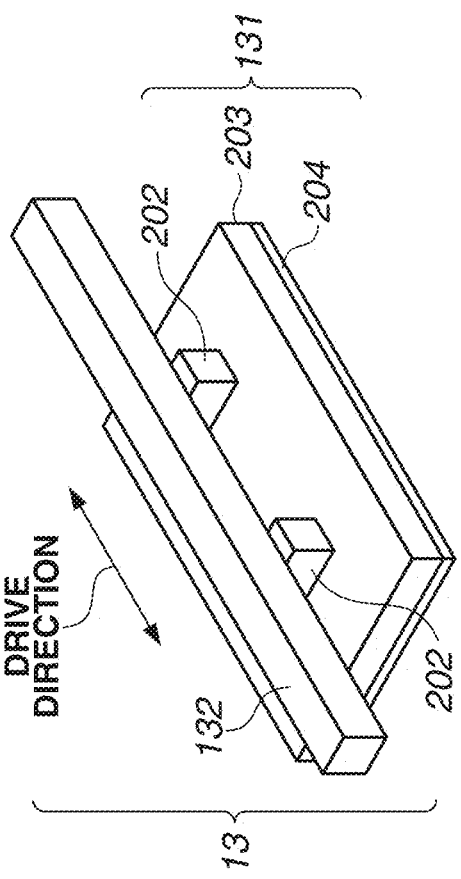
Figure 4D:
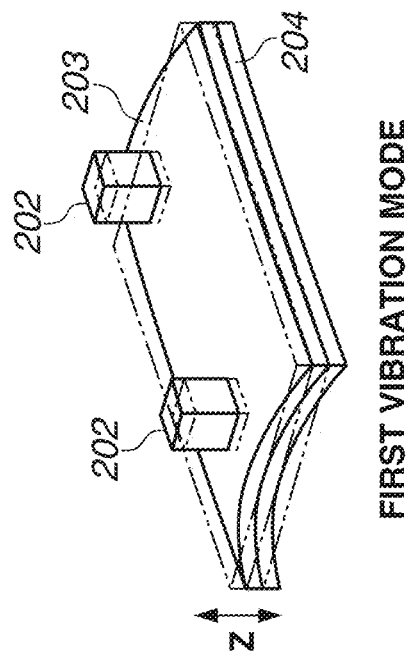

FIG. 4B illustrates an electrode pattern of the piezoelectric element 204. For example, two different electrode regions having an equal longitudinal size are formed on the piezoelectric element 204 of the vibrator 131. The two electrode regions have the same polarization direction (positive direction). Referring to FIG. 4B, the electrode region on the right-hand side of the two electrode regions of the piezoelectric element 204 is applied with an AC voltage VB, and the electrode region on the left-hand side of the two electrode regions of the piezoelectric element 204 is applied with an AC voltage VA.

Assume a case where the AC voltages VB and VA have frequencies in the vicinity of the resonance frequency of the first vibration mode, and are in the same phase. At a certain moment, the entire piezoelectric element 204 (two electrode regions) expands. At another moment, the entire piezoelectric element 204 (two electrode regions) contracts. As a result, a vibration of the first vibration mode illustrated in FIG. 4C occurs in the vibrator 131 (hereinafter this vibration is also referred to as a "thrust-up vibration"). Thus, a displacement in the thrust-up direction (Z direction) occurs in the protruding members 202.

Assume another case where the AC voltages VB and VA have frequencies in the vicinity of the resonance frequency of the second vibration mode, and are out of phase by 180 degrees. At a certain moment, the electrode region on the right-hand side of the piezoelectric element 204 contracts, and the electrode region on the left-hand side of the piezoelectric element 204 expands. At another moment, the electrode region on the right-hand side of the piezoelectric element 204 expands, and the electrode region on the left-hand side of the piezoelectric element 204 contracts. As a result, a vibration of the second vibration mode, as illustrated in FIG. 4D, occurs in the vibrator 131 (hereinafter this vibration is also referred to as a "feeding vibration"). Thus, a displacement in the drive direction (feeding direction or X direction) occurs in the protruding members 202.

Applying two different AC voltages having frequencies in the vicinity of the resonance frequency of the first and the second vibration modes to the electrodes of the piezoelectric element 204 therefore enables excites a vibration as a combination of the first and the second vibration modes.

By combining the two vibration modes in such a way, the protruding members 202 perform an elliptic motion in the section perpendicularly intersecting with the Y direction (direction perpendicularly intersecting with the X and the Z directions) illustrated in FIG. 4D. This elliptic motion drives the contact member 132 in the directions of the arrow illustrated in FIG. 4A. The direction in which the contact member 132 and the vibrator 131 relatively moves, i.e., the direction in which the contact member 132 is driven by the vibrator 131 (X direction in this case) is referred to as a drive direction.

The ratio R of the amplitude of the second vibration mode to the amplitude of the first vibration mode (amplitude of feeding vibration divided by amplitude of thrust-up vibration) can be changed by changing the phase difference between the 2-phase AC voltages input to the two electrodes with an equal size. This vibration type actuator changes the velocity of the contact member 132 by changing the ratio of the vibration amplitudes.

Although the above descriptions have been made centering on an example of a case where the vibrator 131 stands still (fixed) and the contact member 132 moves (driven), the present embodiment is not limited thereto. With the contact member 132 and the vibrator 131, the positions of contact portions need to change relative to each other. For example, it is also possible that the contact member 132 stands still (fixed) and the vibrator 131 moves (driven). More specifically, according to the present embodiment, "drive" means changing the position of the contact member 132 relative to the vibrator 131. The absolute position of the contact member 132 (the position of the contact member 132 with respect to the position of the housing containing the contact member 132 and the vibrator 131) does not necessarily need to change.

The above descriptions have been made centering on a linear drive (linear motion) vibration type actuator as an example. In other words, the above descriptions have been made centering on an example of a case where the vibrator 131 or the contact member 132 moves (driven) in a linear direction. However, the present embodiment is not limited thereto. With the contact member 132 and the vibrator 131, the positions of contact portions may change relative to each other. For example, the vibrator 131 and the contact member 132 may move in the rotational direction. Examples of vibration type actuators in which a vibrator and a contact member move in the rotational direction include a ring (rotary) vibration type actuator having a ring-shaped vibrator.

Example applications of a vibration type actuator include automatic focus drive of a camera.

FIG. 5 illustrates a lens drive mechanism of a lens barrel. A lens holder drive mechanism based on a vibration type actuator includes a vibrator, a lens holder, and a first and a second guide bars parallelly disposed to slidably support the lens holder. The present exemplary embodiment will be described below centering on a case where the second guide bar as a contact member is fixed to other members of the lens barrel, and the vibrator and the lens holder integrally move.

The vibrator produces a relative moving force between the vibrator and the second guide bar in contact with the protruding members of the vibrator (elastic member) by the elliptic motion of the protruding members of the vibrator (elastic member) generated by applying the drive voltage to the electro-mechanical energy converter. The lens holder integrally fixed with the vibrator is thereby configured to move along the first and the second guide bars.

More specifically, a drive mechanism 300 of the contact member 132 mainly includes a lens holder 302 as a lens support member, a lens 306, the vibrator 131 with a flexible printed circuit board bonded thereto, and a pressure magnet 305. The drive mechanism 300 further includes two different guide bars (a first guide bar 303 and a second guide bar 304), and a base member (not illustrated). The vibrator 131 as an example of a vibrator will be described here.

The first guide bar 303 and the second guide bar 304 are fixedly supported at both ends of the bars (the first guide bar 303 and the second guide bar 304) by a base member (not illustrated) so that the bars are disposed parallel to each other. The lens holder 302 includes a cylindrical holding member 302a, a support member 302b fixedly supporting the vibrator 131 and the pressure magnet 305, and a first guide member 302c acting as a guide with the first guide bar 303 fit thereinto.

The pressure magnet 305 configured to apply pressure includes a permanent magnet, and two different yokes disposed at both ends of the permanent magnet. A magnetic circuit is formed between the pressure magnet 305 and the second guide bar 304, and an attractive force occurs between these members (the pressure magnet 305 and the second guide bar 304).

The pressure magnet 305 and the second guide bar 304 are disposed across a space therebetween. The second guide bar 304 is disposed in contact with the vibrator 131.

The above-described attractive force applies a pressure between the second guide bar 304 and the vibrator 131. The two protruding members 202 of the elastic member 203 are in pressure contact with the second guide bar 304 to form a second guide member. The second guide member forms a guide mechanism by using the attractive force generated by the magnetism. If the second guide member is applied with an external force, the vibrator 131 and the second guide bar 304 are separated. To prevent this separation, the following measures are taken.

More specifically, since a dropout prevention member 302d disposed on the lens holder 302 comes in contact with the second guide bar 304, the lens holder 302 returns to a desired position.

When the vibrator 131 is applied with a predetermined AC voltage (AC signal), a driving force occurs between the vibrator 131 and the second guide bar 304 to drive the lens holder 302.

The actual position (detected position) and the actual velocity (detected velocity) are detected by a position sensor (not illustrated) attached to the contact member 132 or the vibrator 131. The actual position (detected position) is fed back to the control unit 10 as a positional deviation. The vibration type actuator is thereby subjected to feedback control so that the actual position follows the target position for each unit time. The actual velocity (detected velocity) is input to the machine learning unit 12 to be used as learning data together with the control amounts (phase difference and frequency) output from the control unit 10. The learning data includes a pair of input data and output data (correct answer data). According to the present exemplary embodiment, the learning data includes a pair of the detected velocity as input data and control amounts (phase difference and frequency) as output data (correct answer data).

The present exemplary embodiment will be described below centering on a 2-phase drive control apparatus that drives a piezoelectric element as an electro-mechanical energy converter on a 2-phase basis. However, the present exemplary embodiment is not limited to 2-phase drive, and is also applicable to a vibration type actuator with two or more phases.

The machine learning unit 12 will now be described in detail. A control amount output unit having a learning model includes an NN structure (see FIGS. 3A to 3C) to which the actual velocity (detected velocity) from the velocity detection unit 16 and the target deviation are input, and from which the phase difference and frequency are output. The target deviation refers to a value set to be followed by the positional deviation when the contact member 132 is moved relative to the vibrator 131.

The target deviation has the same data form as the positional deviation. Although the target deviation is set to zero, for example, an offset value may be applied to compensate for backlash of a mechanical system.

The control amounts (phase difference and frequency) output from the control unit 10 are used as correct answer data. The machine learning unit 12 compares such control amounts with the control amounts output from the control amount output unit having an unlearned learning model or a learning model currently being learning, to calculate errors.

Although the present exemplary embodiment uses the phase difference and frequency as control amounts, a combination of the pulse width and frequency, and a combination of the pulse width and phase difference can also be used as control amounts. The output layer of the NN may include one neuron, and may be designed such that either one of the phase difference, frequency, and pulse width is selected. In the following descriptions, a "control amount output unit having a learning model" is also simply referred to as a "learning model".

FIG. 6 is a control flowchart based on machine learning and a learned model according to the present exemplary embodiment. In step S1, the machine learning unit 12 sets the weights and threshold values of the first learned model 103 and the second learned model 107 of the control unit 10 to the initial values. Although the initial values are set based on a random function (unlearned state), previously learned parameters may be set. In step S2, the machine learning unit 12 controls the vibration type actuator by using the unlearned model (unlearned NN).

In step S3, the machine learning unit 12 acquires, as learning data, the addition value of the control amounts output from the first learned model 103 and the second learned model 107 during the drive of the vibration type actuator. Time-series data of the actual velocity (detected velocity) detected by the velocity detection unit 16 and the positional deviation (shift amount) is acquired as learning data during the drive of the vibration type actuator. In step S4, the machine learning unit 12 performs the optimization operation of the learning model based on the machine learning by using the control amounts of the learning data as correct answer data. The optimization refers to adjusting the parameters of the NN such that the output from the NN by the input to the NN is approximated to the learning data, and is not limited to adjusting the parameters of the NN such that the output from the NN by the input to the NN coincides with the learning data.

The weights and threshold values of the NN are thus optimized by the machine learning, and the parameters of the first learned model 103 and the second learned model 107 are updated. The machine learning unit 12 has a program that causes a computer (not illustrated) to execute these steps S1 to S4. In step S5, the machine learning unit 12 controls the vibration type actuator by using the learned models (the first learned model 103 and the second learned model 107) having the updated weights and threshold values.

After the control, the processing returns to step S3 to cope with changes of drive conditions or temperature environment. In step S3, the machine learning unit 12 acquires the learning data. To acquire the learning data, the machine learning unit 12 implements batch learning in which learning is performed during the drive deactivation, or on-line learning in which successive learning is performed during the drive.

FIGS. 7A and 7B are timing charts illustrating batch learning and on-line learning (manufacturing methods of the vibration type actuator control apparatus) performed by the machine learning unit 12. The horizontal axis is assigned time, and the vertical axis is assigned the target position to be given as a command value to subject the vibration type actuator to feedback control.

FIG. 7A illustrates an example of the batch learning in which learning is performed during the drive deactivation (cases other than a case of moving the contact member 132 relative to the vibrator 131). The present exemplary embodiment acquires, as learning data, the time-series data of the detected velocity detected during the drive period of the vibration type actuator and the control amounts, and updates the parameters (weights and threshold values) of the machine learning and the NN by using the deactivation period. However, the machine learning may not be performed for each deactivation period. For example, it is possible to perform learning only when a change of the temperature environment or drive conditions is detected.

FIG. 7B illustrates an example of the on-line learning in which successive learning is performed during the drive (a case of moving the contact member 132 relative to the vibrator 131). The present exemplary embodiment performs the on-line machine learning in parallel with the drive period of the vibration type actuator, and updates the parameters (weights and threshold values) of the NN during the drive period. Applying the on-line learning also enables coping with load variations occurring during the drive period.

Figure 8A:
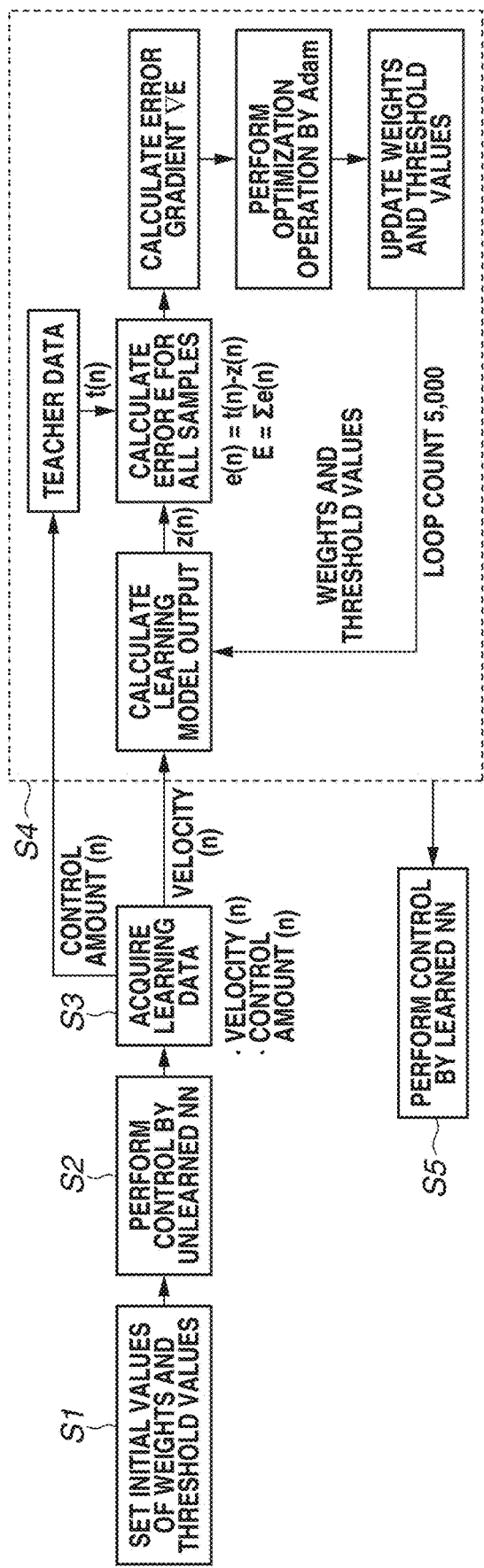
FIG. 8A is a flowchart illustrating Adam as a parameter optimization method for a neural network.
Figure 8C:
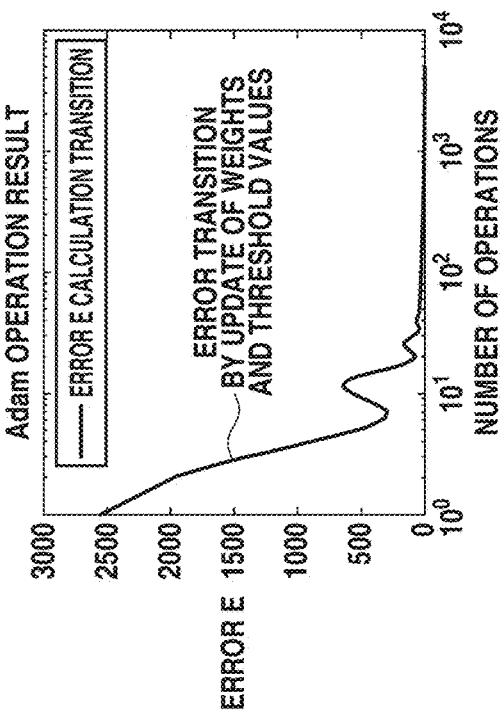
FIG. 8C illustrates an error transition.
Figure 8B:
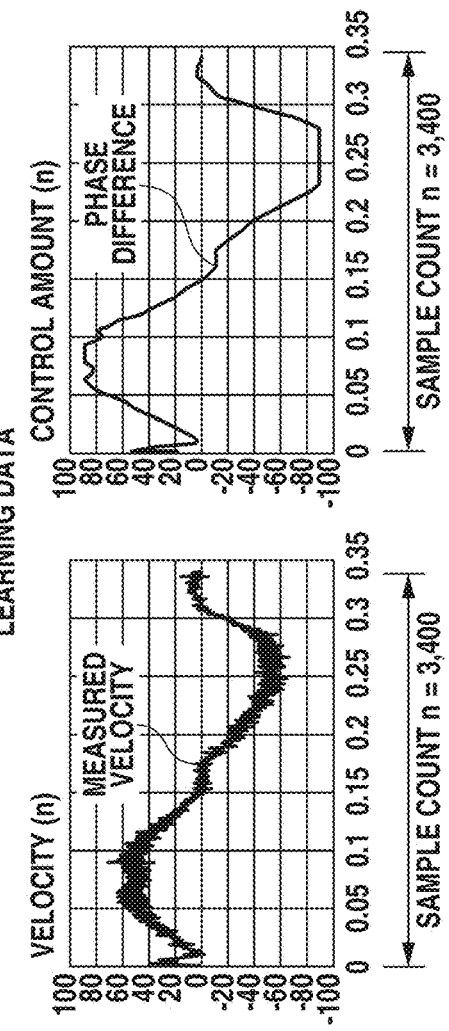
FIG. 8B illustrates time-series learning data.

The above-described machine learning in step S4 will be descried with reference to FIGS. 8A to 8C. FIG. 8A is a flowchart illustrating Adam as a parameter optimization method (optimization algorithm) for the NN. Steps S1 and S2 are as described above with reference to FIG. 6.

In step S3, the machine learning unit 12 acquires the control amount (n) and the detected velocity (n) as time-series learning data illustrated in FIG. 8B. Although the present exemplary embodiment will be described centering on the first learning unit 110, the second learning unit 111 performs similar procedures and redundant descriptions thereof will be omitted. The detection velocity (n) and the control amount (n) are measurement data when the vibration type actuator 13 is controlled based on an unlearned model. The detected velocity (n) refers to the velocity detected by the velocity detection unit 16 when the vibration type actuator 13 is driven based on the control amount (n). The sample count n is 3,400 for each of the detection velocity and the control amount (phase difference). This is measurement data when the vibration type actuator 13 is driven for 0.34 seconds at a control sampling rate (1/control sampling interval) of 10 kHz.

The learning data may not be acquired at the control sampling rate. Thinning out sampling leads to saving the memory and shortening the learning time. In the present embodiment, the machine learning unit 12 inputs the detected velocity (n) as the input to a learning model and acquires an output z(n) as a result of the operation (derivation) based on the learning model. The machine learning unit 12 then compares the output z(n) with the control amount (n) as the correct answer data of the learning data to calculate an error e(n).

More specifically, the error e(n)=(z(n)−control amount (n))$^2$. In step S4, the machine learning unit 12 calculates an error E (=Σe(n)=Σ(z(n)−control amount (n))$^2$) for 3,400 samples in the first loop, and calculates an error gradient ∇E of each of weights (wh and wo) and threshold values (θh and θo).

By using the error gradient ∇E, the machine learning unit 12 performs the following parameter optimization through Adam as an optimization operation method (optimization algorithm).

$$v_t = \beta_1 \cdot v_{t-1} + (1 - \beta_1) \cdot \nabla E \quad (1)$$
$$s_t = \beta_2 \cdot s_{t-1} + (1 - \beta_2) \cdot \nabla E^2$$

$$w_t = w_{t-1} - \eta \cdot \frac{v_t}{\sqrt{s_t + \varepsilon}}$$

In the formula (1), $w_t$ denotes the amount of parameter update, $\nabla E$ denotes the error gradient, $V_t$ denotes the moving average of the error gradient, $S_t$ denotes the moving average of the square of the error gradient, $\eta$ denotes the learning rate, and c denotes the division-by-zero prevention constant.

Parameter values $\eta=0.001$, $\beta_1=0.9$, $\beta_2=0.999$, and $\varepsilon=10e-12$ were used. Each time the optimization operation is repeated, the weights and the threshold values are updated, and the output z(n) of the learning model is approximated to the control amount (n) of the correct answer data, thus decreasing the error E.

FIG. 8C illustrates a transition of the error E based on the operation loop count. Other techniques (algorithms) are also applicable as an optimization method (optimization algorithm).

Figure 9A:
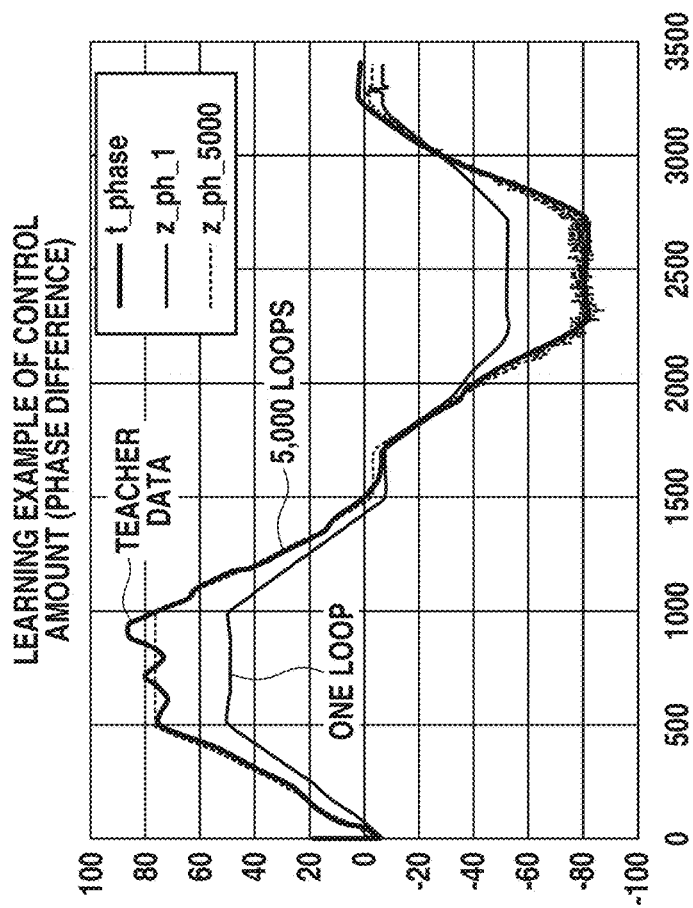
FIGS. 9A and 9B illustrate a comparison of operation results of Adam, RMSprop, Momentum, and stochastic gradient descent (SGD) based on a learning model and measured learning data according to the first exemplary embodiment of the present disclosure.

FIG. 9A illustrates a comparison of operation results of Adam, RMSprop, Momentum, and SGD based on the learning model and measured learning data according to the present exemplary embodiment. From the viewpoint of the number of operations, stability, and final error, the most excellent result was obtained with Adam.

Figure 9B:
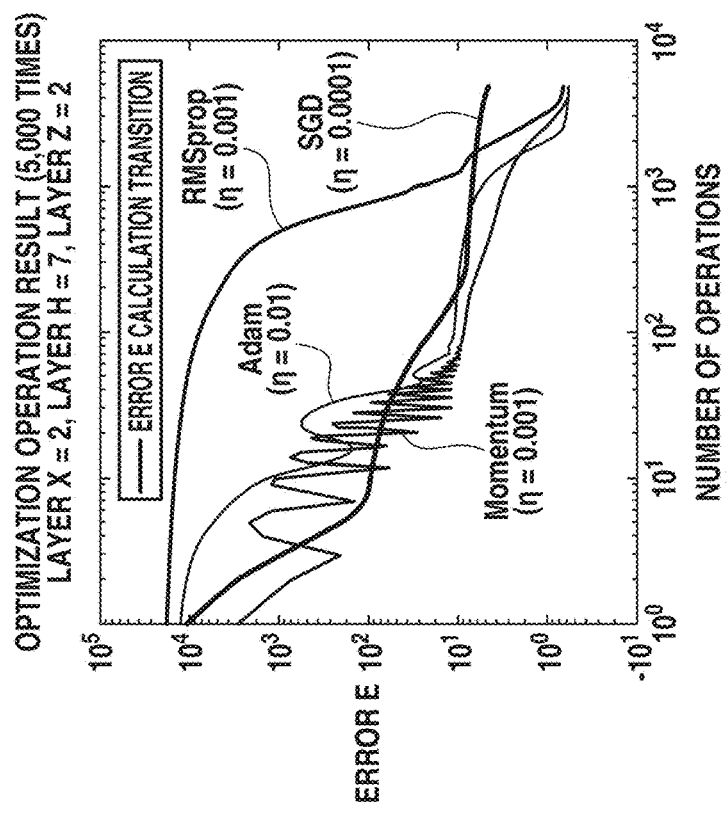

FIG. 9B illustrates a learning example of the control amount (phase difference) by Adam. FIG. 9B illustrates a state where the output z of the learning model in the first loop is largely different from the control amount t of the correct answer data. After the operation is repeated 5,000 times (loop count=5,000), the output z of the learning model substantially coincides with the control amount t of the correct answer data. Although, in this learning example, the machine learning unit 12 performs the optimization with a loop count of 5,000, it is desirable to suitably adjust the loop count according to the convergence rate.

The above completes the description of the control apparatus according to the present embodiment. The control unit 10 and the machine learning unit 12 include, for example, a central processing unit (CPU), digital devices such as a programmable logic device (PLD) including an application specific integrated circuit (ASIC), and elements such as an analog-to-digital (A/D) converter. The AC signal generation unit 104 of the drive unit 11 includes, for example, a CPU, a function generator, and a switching circuit. The booster circuit of the drive unit 11 includes, for example, coils, a transformer, and capacitors. Each of the control unit 10, the machine learning unit 12, and the drive unit 11 may include not only one element or circuit but also a plurality of elements or circuits. Each piece of processing in the control unit 10, the machine learning unit 12, and the drive unit 11 may be performed by any element or circuit.

Results of the applying the control according to the present embodiment to an actual machine will be described below.

FIGS. 10A and 10B illustrate results of the feedback control on the vibration type actuator 13 performed by the control apparatus according to the present embodiment, based on a predetermined target position pattern.

The target velocity relates to a pattern in which a reciprocal operation is performed by the trapezoid drive at up to 50 mm/s, with a 5 mm stroke including the positioning operation. In the charts, the horizontal axis is assigned time (second). In the top charts, the vertical axis is assigned the velocity (mm/s). In the bottom charts, the vertical axis on the left-hand side is assigned the target position (with an encoder pulse count of 8,000 pls per mm), and the vertical axis on the right-hand side is assigned the positional deviation in µm (micrometers).

FIG. 10A illustrates results of proportional-integral-derivative (PID) control according to a comparative example. FIG. 10B illustrates results of PID control according to the present embodiment. The starting frequency was set to 93 kHz in both cases. Referring to the results in the top charts, the detected velocity substantially coincides with the target velocity, and favorable traceability is obtained. The detected velocity and the velocity deviation according to the present embodiment are slightly noisy because of differences in filter processing. This phenomenon is not related to the purpose of the present embodiment and therefore may be ignored. Referring to FIG. 10A, "Target Velocity and Detected Velocity" appears as a single line, it includes both the line of the target velocity and the line of the detected velocity.

The bottom charts representing the traceability of the detected velocity with respect to the target position will now be described. The bottom charts illustrate that the present embodiment has largely improved the positional deviation in the PID control. This effect is obtained by learning the velocity characteristics for the control amounts of the vibration type actuator.

Figure 11:
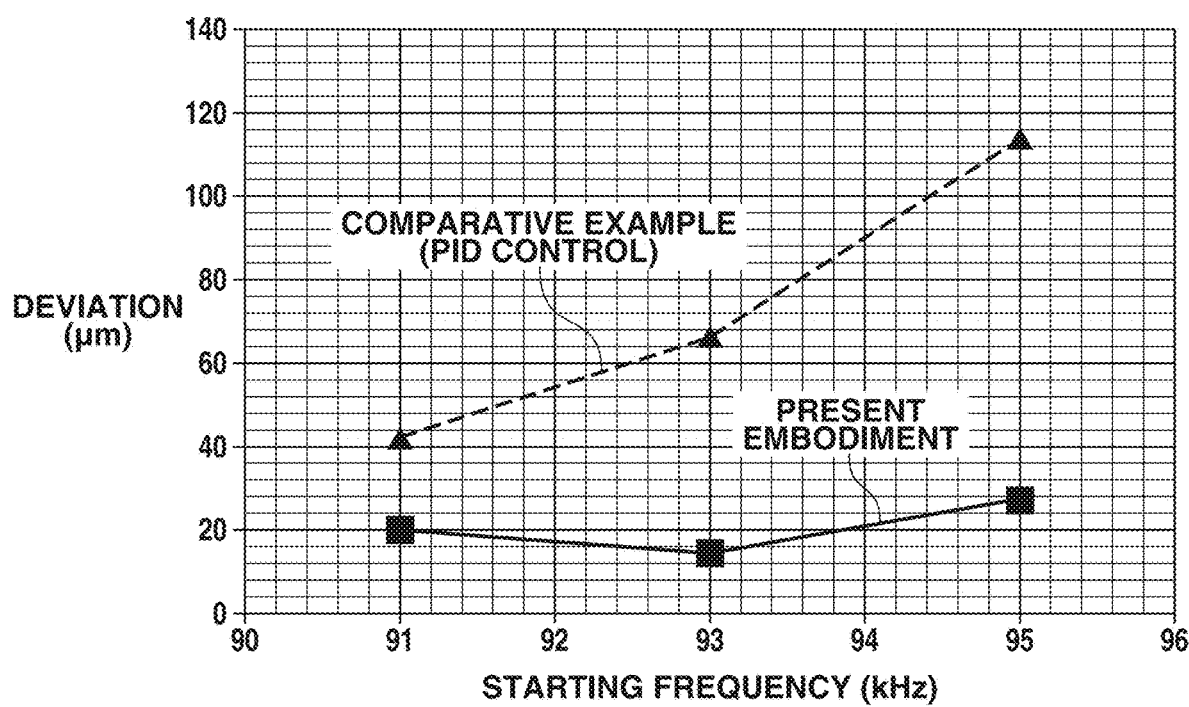
FIG. 11 illustrates a result indicating the robustness of the control apparatus according to the embodiment of the present disclosure.

FIG. 11 illustrates a result indicating the robustness in the vibration type actuator control apparatus according to the present embodiment.

This chart illustrates a result of performing the positioning operation by the trapezoidal drive at a maximum velocity of 50 mm/s and calculating the positional deviation during the 5 mm stroke reciprocal operation with 36. The horizontal axis is assigned the starting frequency, and the vertical axis is assigned the positional deviation. The result of the comparative example is obtained by the conventional PID control. According to the control result of the present embodiment, the positional deviation has been largely improved in comparison with the comparative example. The chart illustrates that the positional deviation changes small even if the drive frequency changes, meaning that the robustness has been improved by the present embodiment.

As described above, it has been hard for the conventional PID control to cope with load variations since performing control with different starting frequencies causes variations of the velocity gradient by the non-linear characteristics of the vibration type actuator. According to the present embodiment, the control amounts according to the target velocity are output from the first learned model 103. The control deviation arising from drive conditions or temperature environment can be supplemented by the control amounts output from the second learned model 107, thus implementing high-precision and high-robustness control.

Other exemplary embodiments of the present disclosure will now be described.

Figure 12:
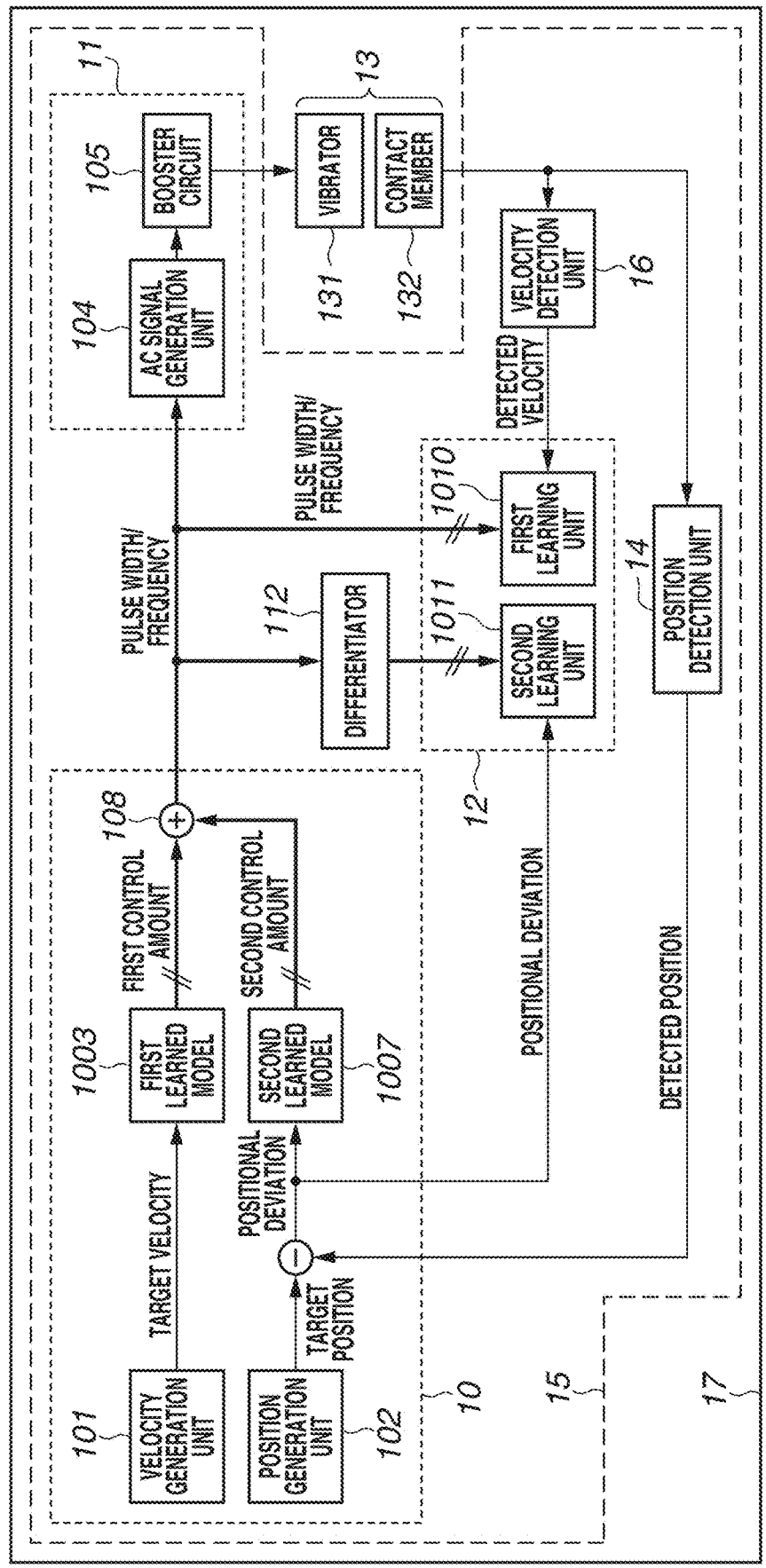
FIG. 12 illustrates a block diagram of a vibration type actuator control apparatus according to a second exemplary embodiment of the present disclosure.

FIG. 12 illustrates a vibration type actuator control apparatus according to the second exemplary embodiment of the present disclosure.

The present embodiment performs the machine learning by using the pulse width and frequency as control amounts, and performs control by using such learned model. In such a control block, the position feedback control for the vibration type actuator 13 is performed based on the addition value of the control amounts output from a first learned model 1003 and a second learned model 1007, the pulse width, and the frequency. The machine learning unit 12 acquires, as learning data, the control amounts (pulse width and frequency) output from the control unit 10 and the relative velocity detected by the velocity detection unit 16, and performs the machine learning for the first learned model 1003. The machine learning unit 12 also acquires the differential values of the control amounts and the positional deviation as learning data, and performs the machine learning for the second learned model 1007.

Figure 13A:
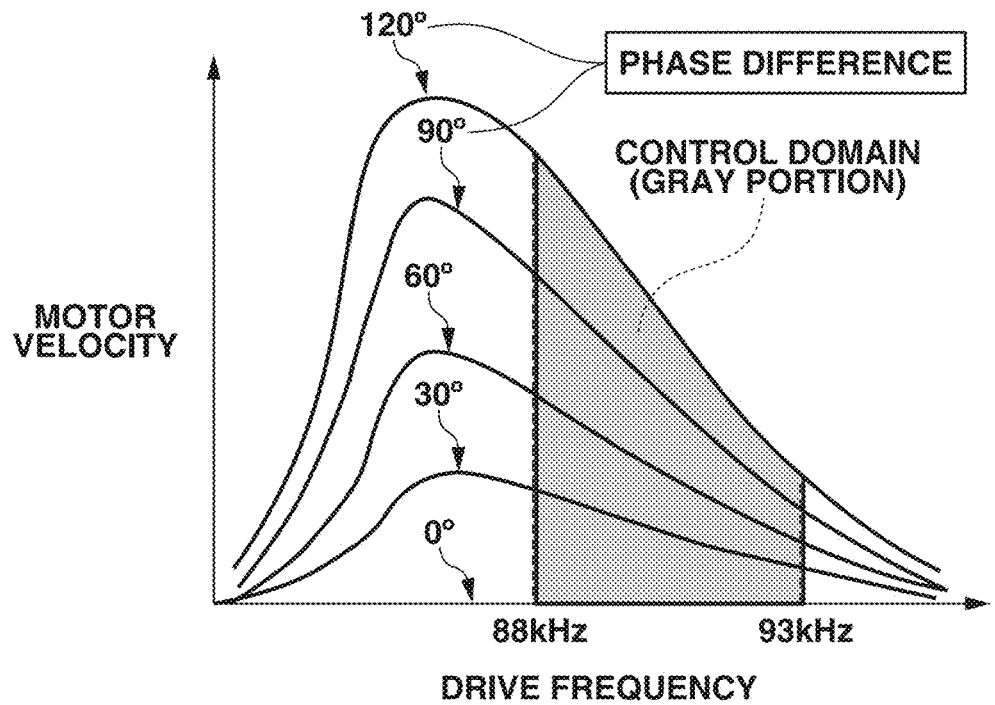
FIGS. 13A and 13B illustrate velocity characteristics of the vibration type actuator based on control amounts.
Figure 13B:
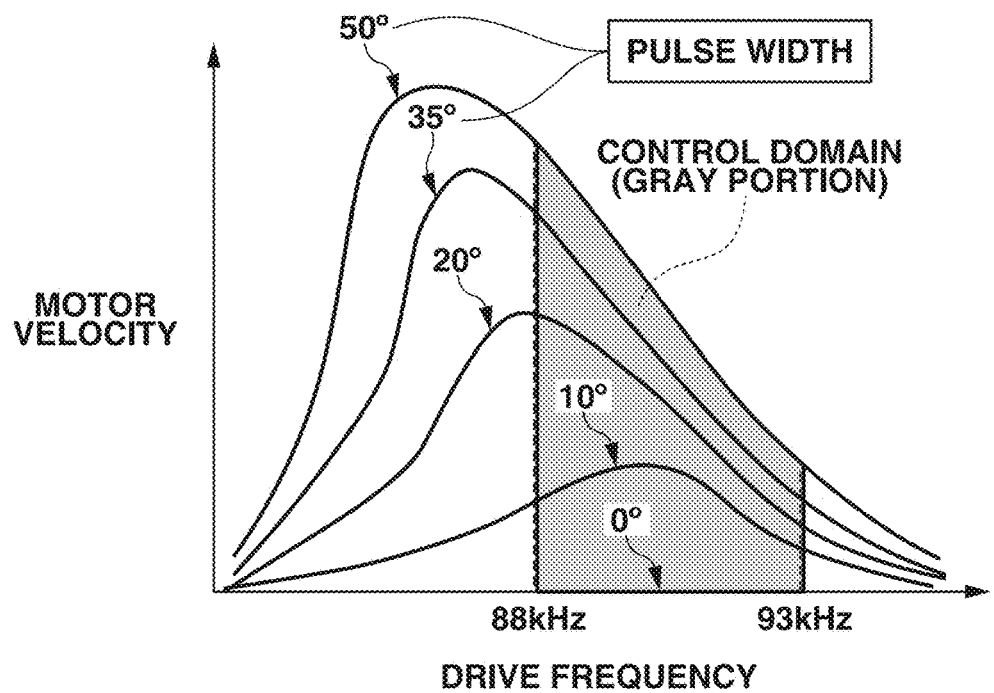

FIGS. 13A and 13B illustrate the velocity characteristics of the vibration type actuator 13 based on the control amounts.

FIG. 13A illustrates control using the phase difference and frequency (refer to the first exemplary embodiment). The horizontal axis is assigned the frequency, and the vertical axis is assigned the motor speed. As illustrated in 13A, the motor speed is controlled by operating each of the phase difference and frequency. When control is performed in the gray region, for example, each control amount is output with a drive frequency from 88 to 93 kHz and a phase difference from 0 to ±120 degrees. The first learned model 103 according to the present embodiment outputs two different control amounts in response to an input of the target velocity.

FIG. 13B illustrates control using the pulse width and frequency according to the present exemplary embodiment. Likewise, the motor speed can be controlled by operating each of the pulse width and frequency. For example, when control is performed in the gray region, each control amount is output with a drive frequency from 88 to 93 kHz and a pulse width from 0 to 50%. Likewise, the first learned model 1003 outputs two different control amounts in response to the target velocity input to the first learned model 1003.

A third exemplary embodiment of the present disclosure will now be described.

Figure 14:
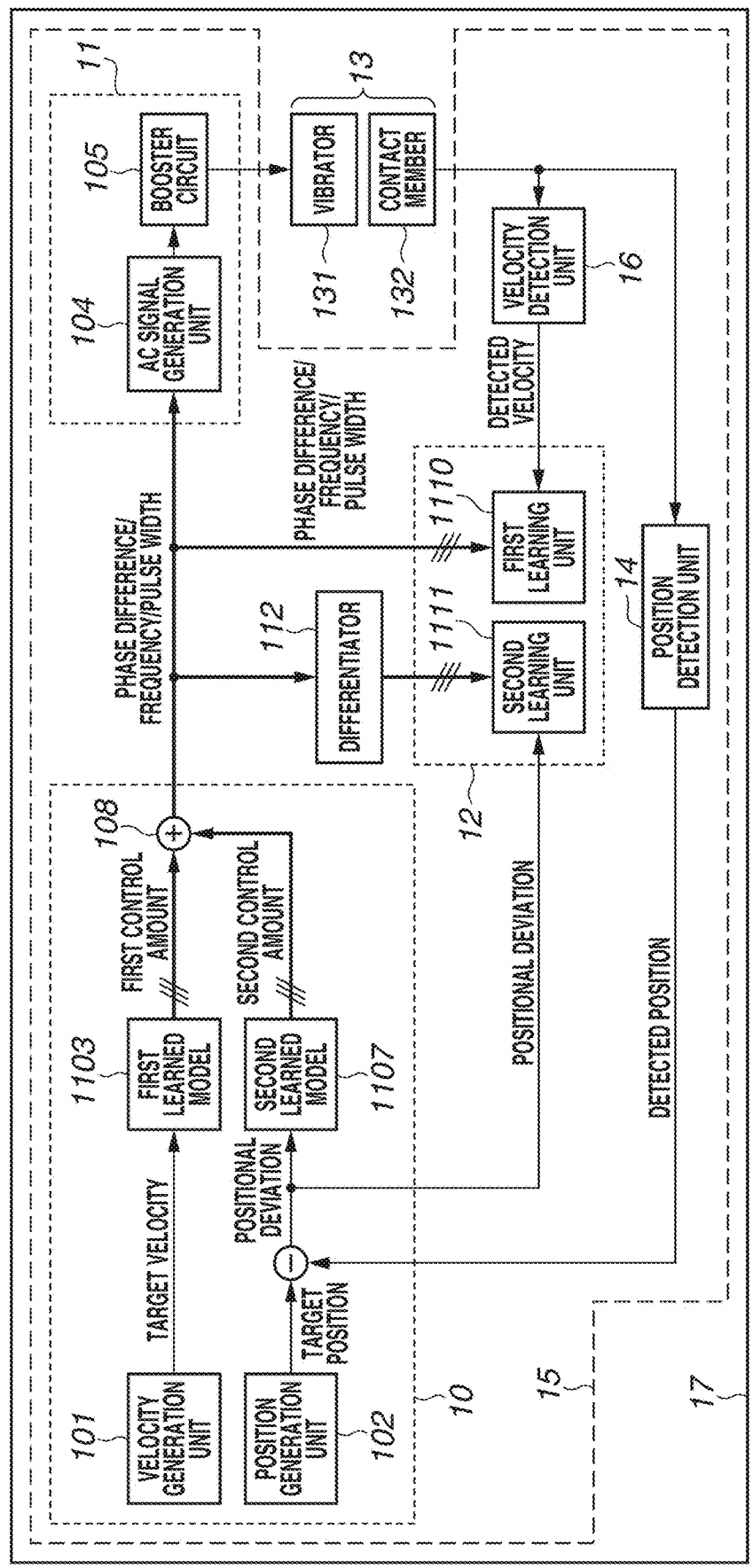
FIG. 14 illustrates a block diagram of a vibration type actuator control apparatus according to a third exemplary embodiment of the present disclosure.

FIG. 14 is a control block diagram illustrating a vibration type driving apparatus in a case of control using a learned model that completed the machine learning by using the phase difference, frequency, and pulse width as control amounts. Referring to FIG. 14, the portion excluding the vibration type actuator 13 from the vibration type driving apparatus 17 forms the control apparatus 15. In such a control block, the position feedback control for the vibration type actuator 13 is performed based on each of the control amounts (pulse width and frequency) output from each of the first learned model 1103 and the second learned model 1107. More specifically, the control is performed by using the addition value of the control amounts output from the first learned model 1103 and the control amounts output from the second learned model 1107. The addition of the control amounts is performed between the control amounts of the same types. The target velocity is input to the first learned model 1103 which then outputs the phase difference, frequency, and pulse width having been subjected to the operation by the NN, to the drive unit 11. The positional deviation is input to the second learned model 1107 which then outputs the phase difference, frequency, and pulse width having been subjected to the operation by the NN configuring the second learned model 1107, to the drive unit 11.

The machine learning unit 12 acquires, as learning data, the three control amounts output from the control unit 10 and the relative velocity (detected velocity) detected by the velocity detection unit 16, and performs the machine learning for the first learned model 1103. The machine learning unit 12 also acquires the differential values of the control amounts and the positional deviation as learning data, and performs the machine learning for the second learned model 1107.

Figure 15:
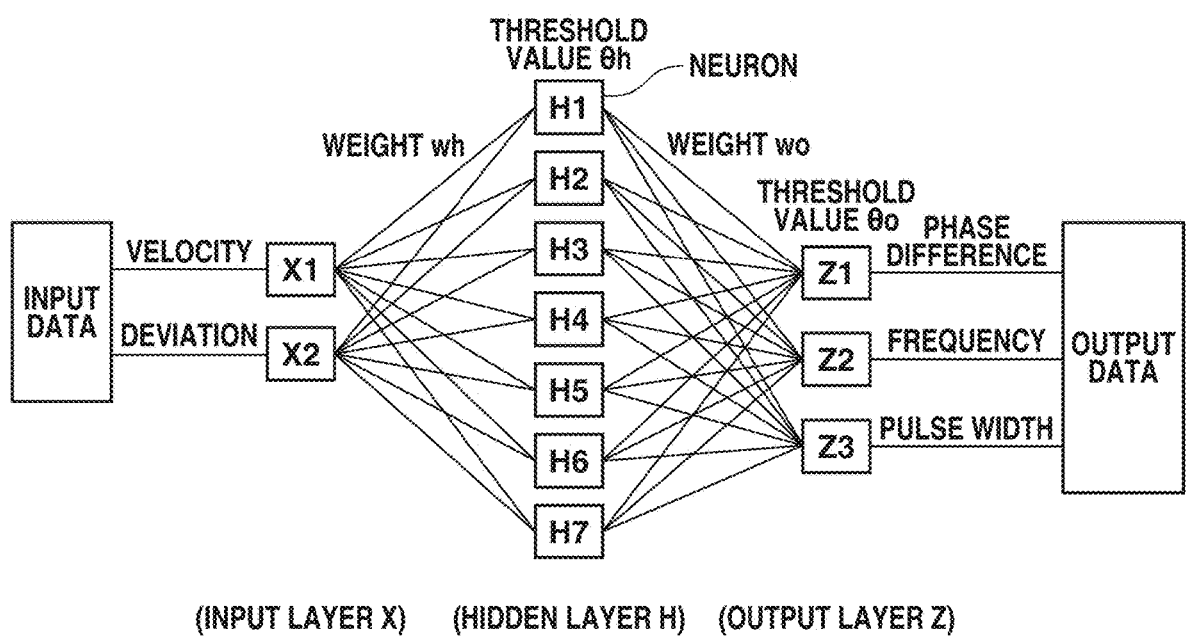
FIG. 15 illustrates a neural network structure in a learning model that outputs the phase difference, frequency, and pulse width.

FIG. 15 illustrates the NN structure that outputs the phase difference, frequency, and pulse width.

The first learned model 1103 and the second learned model 1107 has an NN structure to which the target velocity or the positional deviation is input, and the NN structure outputs the three control amounts. The learning data to be used for the machine learning may be measurement data in a case of controlling the vibration type actuator by a learned model, or measurement data in a case of controlling the vibration type actuator by an unlearned model with parameters set by a random function. In addition, measurement data in a case of controlling the vibration type actuator by the open drive, or measurement data in a case of controlling the vibration type actuator by PID control.

When the weights and threshold values of the NN are determined, parameters having conditions most suitable from the viewpoint of the positional deviation or power consumption may be selected from a plurality of learning data pieces. This is because conditions for obtaining a predetermined velocity of the vibration type actuator, i.e., combinations of the phase difference, frequency, and pulse width innumerably exist.

Since applying the present exemplary embodiment increases the number of parameters for operating the vibration type actuator, performing suitable machine learning enables fine adjustment of the control performance.

Figure 16:
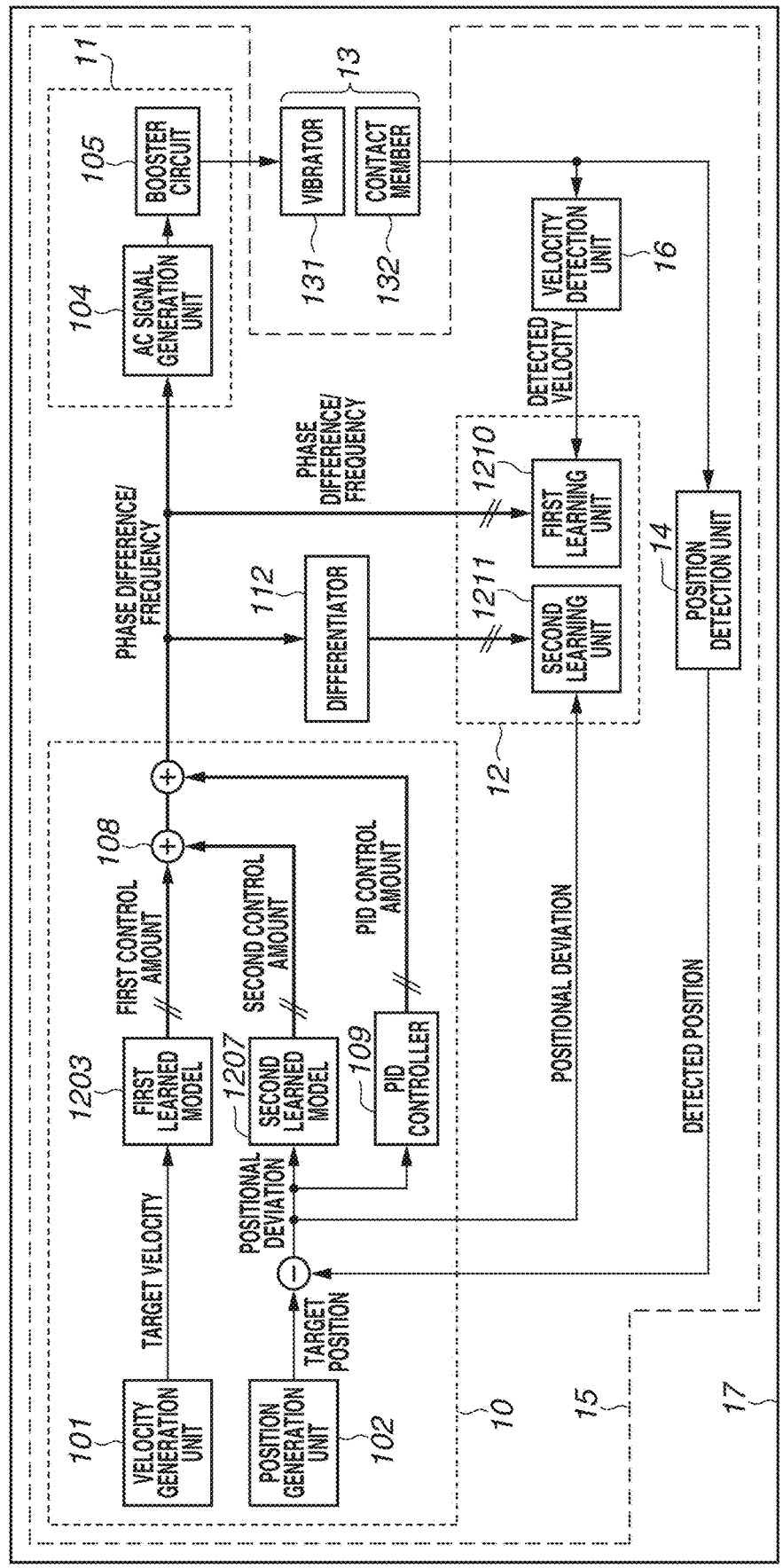
FIG. 16 illustrates a block diagram of a vibration type actuator control apparatus according to a fourth exemplary embodiment of the present disclosure.

FIG. 16 illustrates a vibration type actuator control apparatus according to a fourth exemplary embodiment of the present disclosure.

In such a control block, the position feedback control for the vibration type actuator 13 is performed by connecting a PID controller 109 in parallel with the second learned model 1207. The positional deviation is input to the PID controller 109 which then outputs the control amounts (phase difference and frequency) having been subjected to the PID operation.

The configuration is not limited to a PID controller. For example, proportional (P) control, proportional-integral (PI) control, and proportional-derivative (PD) control are also applicable. The target velocity is input to a first learned model 1203. The PID control amount (third control amount) output from the PID controller 109, the first control amount output from the first learned model 1203, and the second control amount output from the second learned model 1207 are added and then output to the drive unit 11. The machine learning unit 12 acquires, as learning data, the control amounts (phase difference and frequency) output from the control unit 10 and the relative velocity detected by the velocity detection unit 16, and performs the machine learning for the first learned model 1203. The machine learning unit 12 also acquires the differential values of the control amounts and the positional deviation as learning data, and performs the machine learning for the second learned model 1207.

According to the present exemplary embodiment, the control amounts according to the target velocity are output by the first learned model 1203. The control deviation arising from drive conditions and temperature environment can be supplemented by the control amounts output from the second learned model 1207, thus implementing high-accuracy and high-robustness control. Using the PID controller 109 in parallel enables flexibly adjusting the transfer characteristics of the control loop, and further improving the positioning accuracy and robustness.

Figure 17:
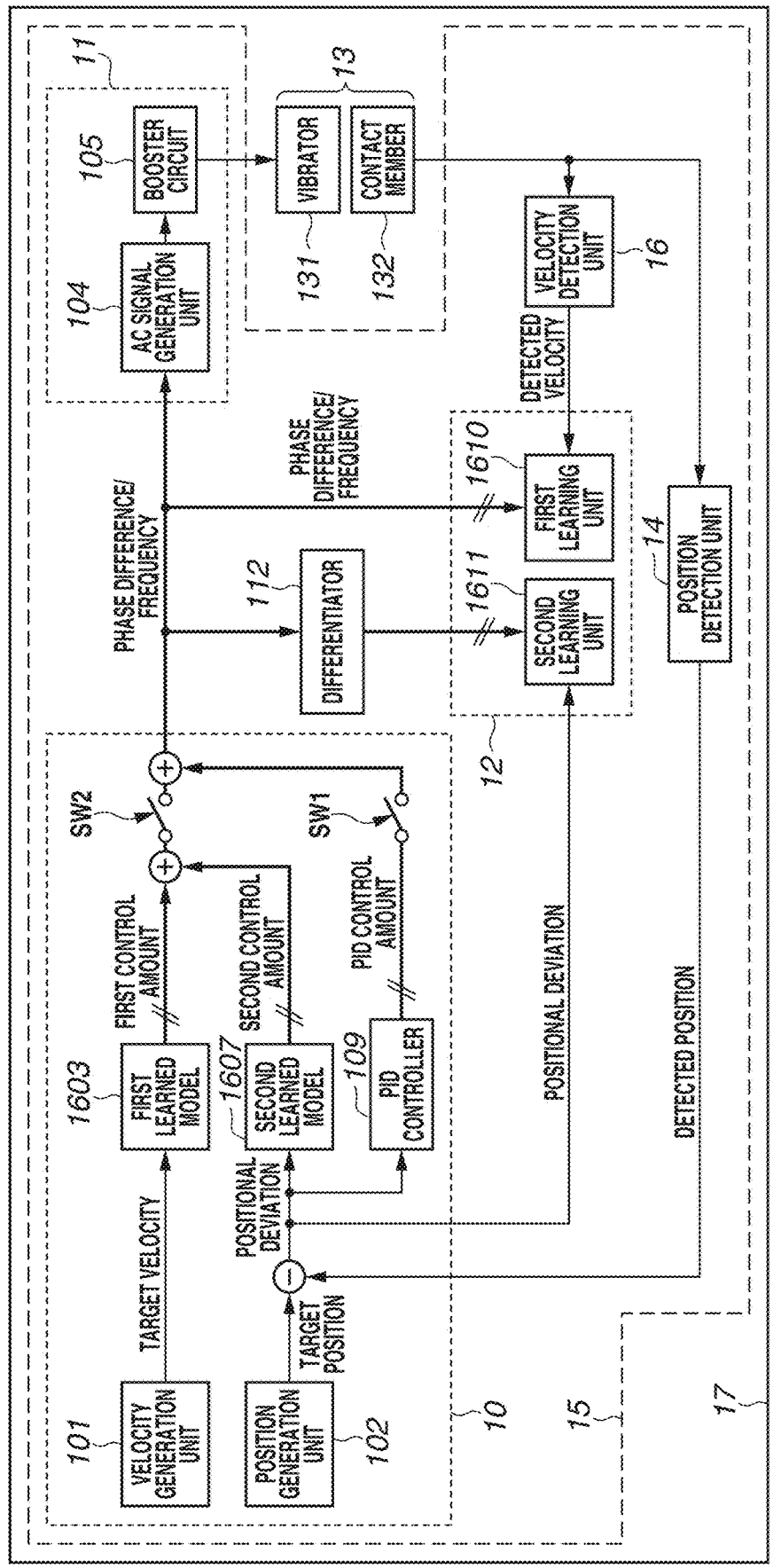
FIG. 17 illustrates a block diagram of a vibration type actuator control apparatus according to a fifth exemplary embodiment of the present disclosure.

FIG. 17 illustrates a vibration type actuator control apparatus according to a fifth exemplary embodiment of the present disclosure.

In such a control block, the PID controller 109 is connected in parallel with a second learned model 1207 for control, and the position feedback control of the vibration type actuator 13 is selectively performed through switches (SWs). A SW 1 turns the output of the PID controller 109 ON or OFF. A SW 2 turns the output of the addition value of the first and the second control amounts ON or OFF. This configuration thus switches between control only by the PID controller 109 and control only by the learned models 1603 and 1607 according to conditions.

Control may be performed with both switches turned ON. This also applies to the machine learning. For example, performing the learning only by the PID controller 109 enables stably generating a learned model even in a state where the learning has not been performed.

Applying the present exemplary embodiment implements high-accuracy and high-robustness control.

Selectively using the PID controller 109 also enables improving the stability of control and learning.

According to the above-described exemplary embodiments, there may be provided a storage unit that stores parameters (a first weight, a second weight, a threshold value of a second neuron, and a threshold value of a third neuron) included in the NN. The NN may be subjected to the machine learning when the parameters included in the NN are replaced by the parameters stored in the storage unit.

The above-described exemplary embodiments may include environmental sensors that detect environmental conditions. The NN may be subjected to the machine learning when the environmental sensors detect environmental changes. The environmental sensors may include at least either one of a temperature sensor or a humidity sensor.

Figure 18B:
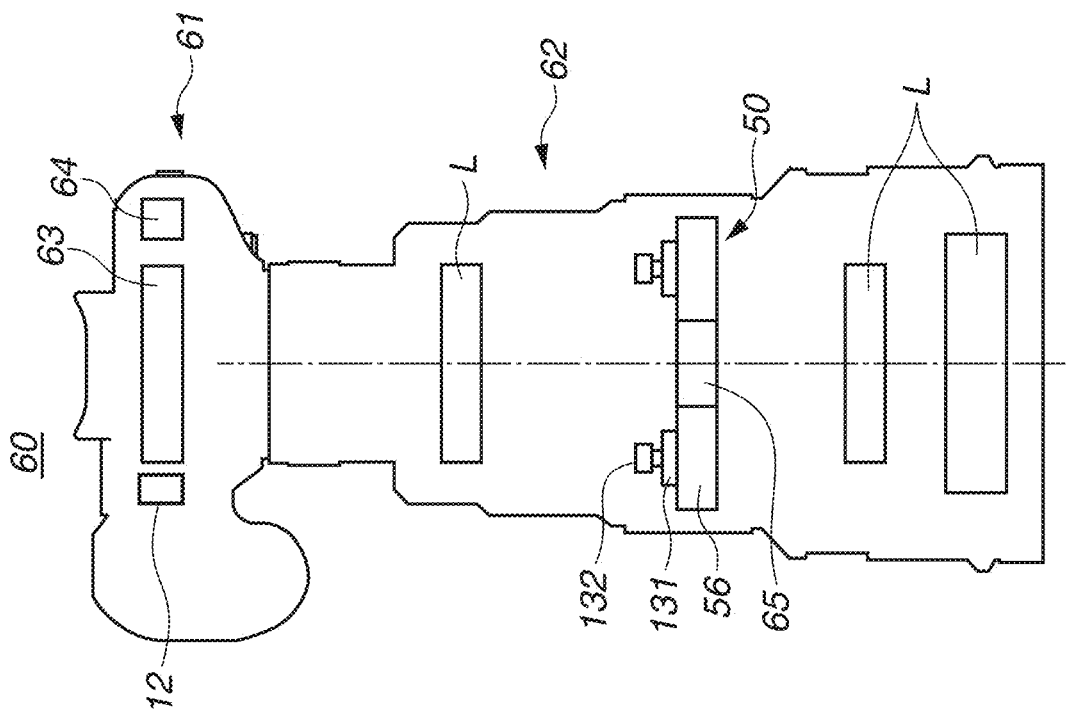
FIG. 18B illustrates a schematic view of an internal configuration of the imaging apparatus according to the example application.
Figure 18A:
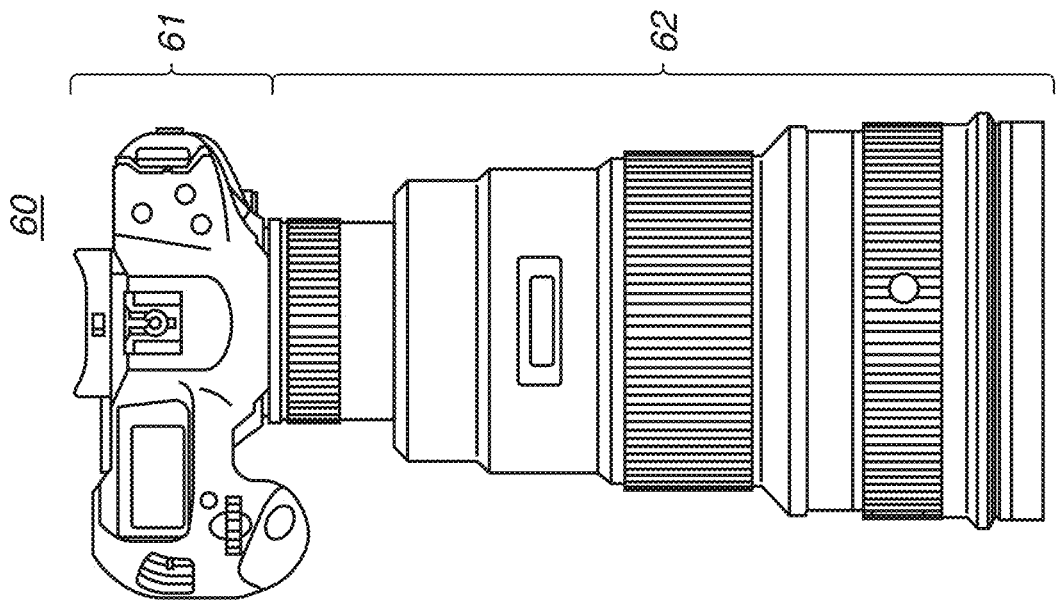
FIG. 18A illustrates a plan view of an outer appearance of an imaging apparatus according to an example application (eighth exemplary embodiment) of the control apparatus according to an embodiment of the present disclosure.

Although the first exemplary embodiment has been described above centering on an example where the vibration type actuator control apparatus is used to drive the automatic focus lens of the imaging apparatus, example applications of the present embodiment are not limited thereto. For example, as illustrated in FIGS. 18A and 18B, the control apparatus can also be used to drive the lens and an image sensor at the time of camera shake correction. FIG. 18A is a plan view (top view) illustrating an outer appearance of an imaging apparatus 60. FIG. 18B is a schematic view illustrating an internal structure of the imaging apparatus 60.

The imaging apparatus 60 generally includes a main body 61, and a lens barrel 62 attachable to and detachable from the main body 61. The main body 61 includes an image sensor 63, such as a charge coupled device (CCD) sensor or complementary metal oxide semiconductor (CMOS) sensor, configured to convert an optical image formed by light that passes through the lens barrel 62 into an image signal, and a camera control microcomputer 64 that controls the entire operations of the imaging apparatus 60. The lens barrel 62 includes a plurality of lenses L, such as a focusing lens and a zoom lens, disposed at predetermined positions.

The lens barrel 62 includes an image shake correction apparatus 50 that includes a disc member 56, and the vibrator 131 disposed on the disc member 56. An image shake correction lens 65 is disposed in a hole formed at the center of the disc member 56. The image shake correction apparatus 50 is disposed to enable the image shake correction lens 65 to move in a plane perpendicularly intersecting with the optical axis of the lens barrel 62. In this case, the vibration type actuator control apparatus 15 according to the present embodiment drives the vibrator 131, and thereby the vibrator 131 and the disc member 56 moves relatively to the contact member 132 fixed to the lens barrel 62, thus driving the image shake correction lens 65.

The vibration type actuator control apparatus 15 according to the present embodiment can also be used to drive the lens holder 302 that moves the zoom lens. Thus, the control apparatus 15 according to the present embodiment is mounted not only on an imaging apparatus but also on an interchangeable lens for lens drive.

The vibration type actuator control apparatus 15 according to the first exemplary embodiment is also used to drive an automatic stage. For example, the control apparatus 15 is also used to drive the automatic stage of a microscope, as illustrated in FIG. 19.

Figure 19:
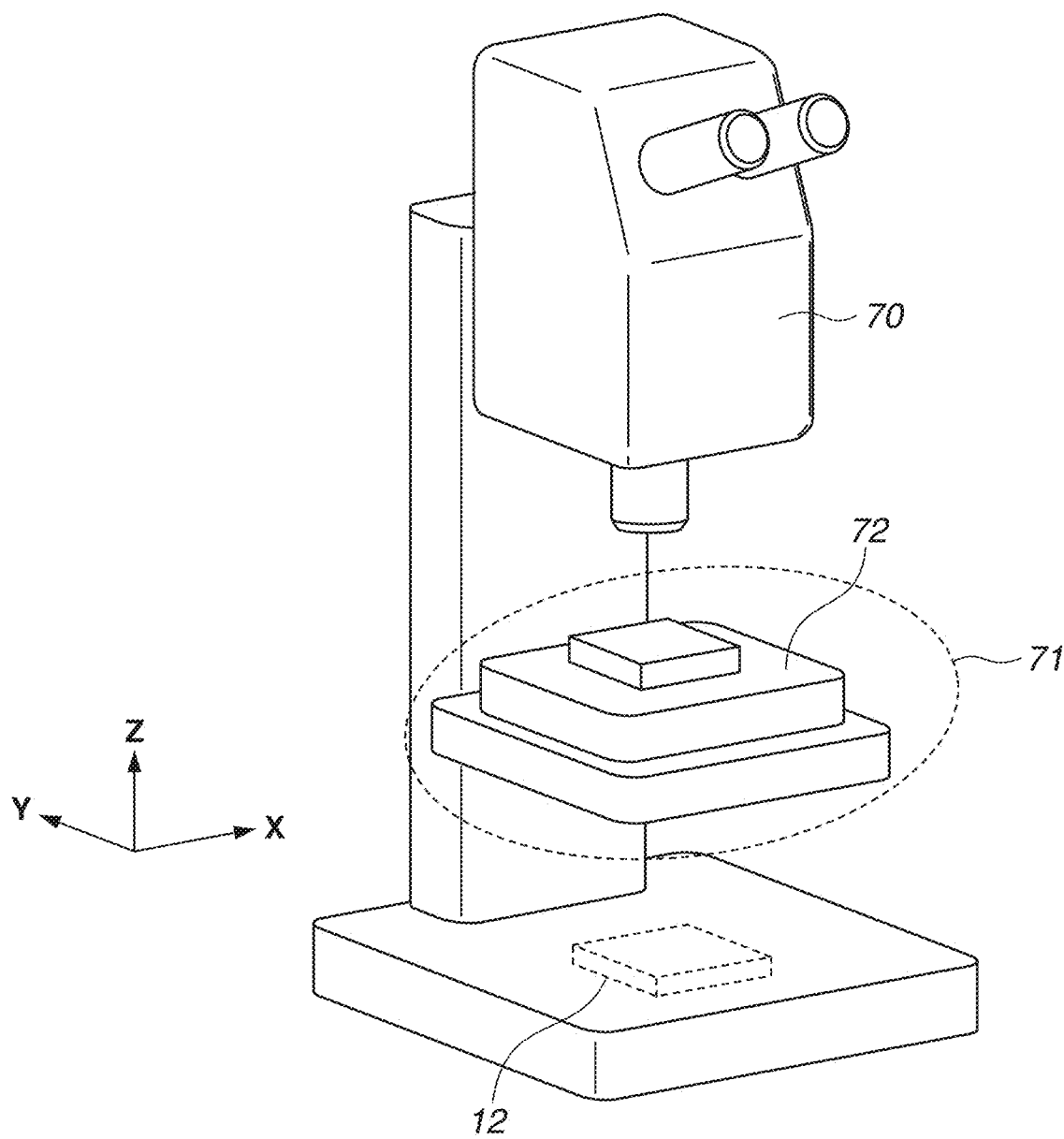
FIG. 19 illustrates an outer appearance of a microscope according to an example application (ninth exemplary embodiment) of the control apparatus according to an embodiment of the present disclosure.
Figure 20A:
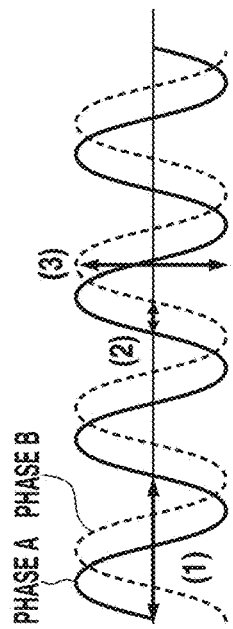
FIGS. 20A to 20D illustrate an example of a conventional common vibration type actuator control apparatus based on Proportional-Integral-Derivative (PID) control.
Figure 20B:
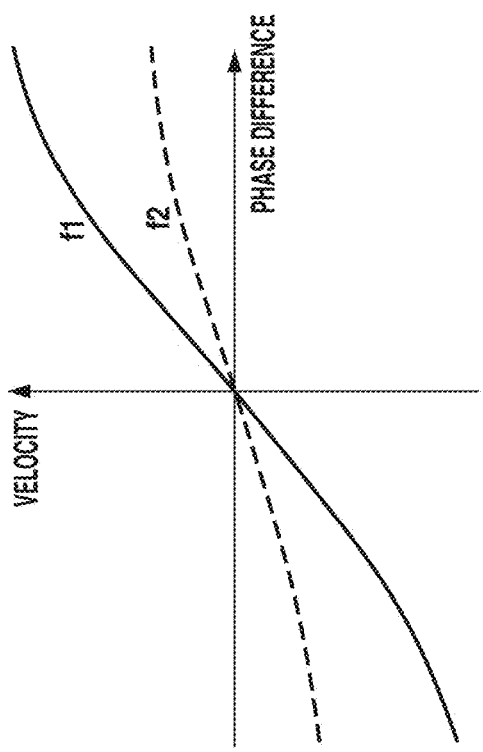
Figure 20C:
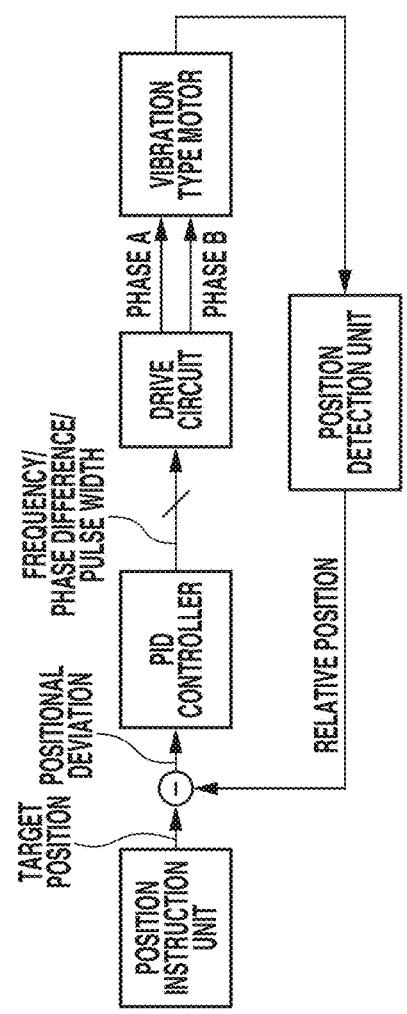
Figure 20D:
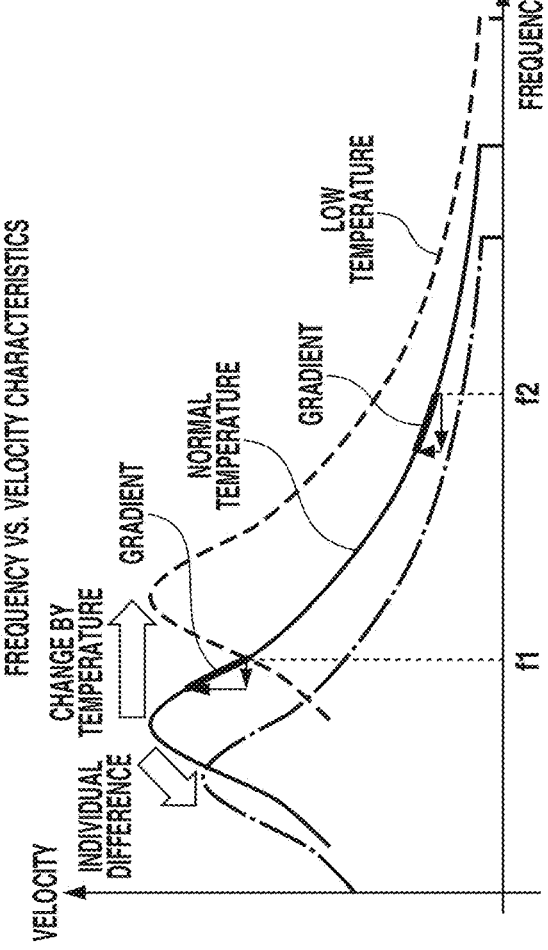

The microscope illustrated in FIG. 19 is composed of an imaging unit 70 including an image sensor and an optical system, and an automatic stage 71 including a stage 72 moved by a vibration type actuator, mounted on a base. The imaging unit 70 captures a magnified image of an object under observation placed on the stage 72. When the observation range is wide, the stage 72 is moved by driving the vibration type actuator by using the vibration type actuator control apparatus 15 according to the first or the second exemplary embodiment. This enables moving the object under observation in the X and Y directions to acquire a number of captured images. Using a computer (not illustrated) enables combining captured images to acquire one high-definition image with a wide observation range.

The present disclosure makes it possible to provide a vibration type actuator control apparatus having a control amount output unit different from the conventional PID controller, as a main control amount output unit.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-033662, filed Mar. 3, 2021, which is hereby incorporated by reference herein in its entirety.

What is claimed is:

1. A vibration type actuator control apparatus configured to move, by using a vibration produced in a vibrator, a contact member in contact with the vibrator relative to the vibrator, the vibration type actuator control apparatus comprising:
a control unit including a first learned model and a second learned model each having a neural network including an input layer, a hidden layer, and an output layer; and
a drive unit configured to move the contact member in contact with the vibrator relative to the vibrator by using control amounts output from the control unit,
wherein, in a case where a target velocity for moving the contact member relative to the vibrator is input, the first learned model is configured to output a first control amount for moving the contact member relative to the vibrator,
wherein, in a case where a positional deviation for moving the contact member relative to the vibrator is input, the second learned model is configured to output a second control amount for moving the contact member relative to the vibrator,
wherein the drive unit is configured to move the contact member relative to the vibrator by using a value based on the first control amount and the second control amount, and
wherein the positional deviation is a value in association with a difference between a target position for moving the contact member relatively to the vibrator and a detected position detected when the contact member is moved relatively to the vibrator.

2. The vibration type actuator control apparatus according to claim 1,
wherein the control unit includes a proportional-integral-derivative (PID) controller,
wherein, when the positional deviation is input, the PID controller outputs a third control amount for moving the contact member relative to the vibrator, and
wherein the drive unit moves the contact member in contact with the vibrator relative to the vibrator by using a value based on the first control amount, the second control amount, and the third control amount as the control amounts output from the control unit.

3. The vibration type actuator control apparatus according to claim 2, further comprising a machine learning unit configured to perform machine learning,
wherein the machine learning unit is configured to perform machine learning on the neural network to be held by the first learned model, by using learning data with an input of a detected velocity detected when the contact member is moved relative to the vibrator and an output of the value based on the first control amount, the second control amount, and the third control amount, and
wherein the machine learning unit further is configured to perform machine learning on the neural network to be held by the second learned model, by using learning data with an input of the positional deviation and an output of a differential value of the value based on the first control amount, the second control amount, and the third control amount.

4. The vibration type actuator control apparatus according to claim 1,
wherein the control unit includes a proportional-integral-derivative (PID) controller,
wherein, when the positional deviation is input, the PID controller outputs a third control amount for moving the contact member relative to the vibrator, and
wherein the drive unit moves the contact member in contact with the vibrator relative to the vibrator by using, as the control amounts output from the control unit, the value based on the first control amount and the second control amount, or a value based on the third control amount.

5. The vibration type actuator control apparatus according to claim 4, further comprising a machine learning unit configured to perform machine learning,
wherein the machine learning unit is configured to perform machine learning on the neural network to be held by the second learned model, by using learning data with an input of a detected velocity detected when the contact member is moved relative to the vibrator and an output of the value based on the first control amount and the second control amount, or the value based on the third control amount, and
wherein the machine learning unit further is configured to perform machine learning on the neural network to be held by the second learned model, by using learning data with an input of the positional deviation and an output of a differential value of the value based on the first control amount and the second control amount, or a differential value of the value based on the third control amount.

6. The vibration type actuator control apparatus according to claim 1,
wherein the control unit includes a PID controller,
wherein, when the positional deviation is input, the PID controller outputs a third control amount for moving the contact member relative to the vibrator, and
wherein the value based on the first control amount and the second control amount is an addition value of the first control amount and the second control amount, and a value based on the first control amount, the second control amount, and the third control amount is an addition value of the first control amount, the second control amount, and the third control amount.

7. The vibration type actuator control apparatus according to claim 1, wherein the control amounts output from the control unit include at least one of the following: a phase difference, a frequency, and a pulse width.

8. The vibration type actuator control apparatus according to claim 1,
wherein the neural network includes layers and parameters,
wherein the layers included in the neural network include the input layer having one or a plurality of first neurons, the hidden layer having a plurality of second neurons, and the output layer having one or a plurality of third neurons, and
wherein the parameters included in the neural network include a plurality of first weights for connecting the one or the plurality of first neurons and the plurality of second neurons, a plurality of second weights for connecting the plurality of second neurons and the one or the plurality of third neurons, a threshold value of the plurality of second neurons, and a threshold value of the one or the plurality of third neurons.

9. The vibration type actuator control apparatus according to claim 1, further comprising a machine learning unit configured to perform machine learning, wherein the machine learning unit is configured to perform machine learning on the neural network to be held by the first learned model, by using learning data with an input of a detected velocity detected when the contact member is moved relative to the vibrator and an output of the value based on the first control amount and the second control amount, and wherein the machine learning unit further is configured to perform machine learning on the neural network to be held by the second learned model, by using learning data with an input of the positional deviation and an output of a differential value of the value based on the first control amount and the second control amount.

10. The vibration type actuator control apparatus according to claim 9, wherein the neural network includes layers and parameters, wherein the layers included in the neural network include the input layer having one or a plurality of first neurons, the hidden layer having a plurality of second neurons, and the output layer having one or a plurality of third neurons, and wherein the parameters included in the neural network include a plurality of first weights for connecting the plurality of second neurons and the one or the plurality of first neurons, a plurality of second weights for connecting the plurality of second neurons and the one or the plurality of third neurons, a threshold value of the plurality of second neurons, and a threshold value of the one or the plurality of third neurons.

11. The vibration type actuator control apparatus according to claim 10, wherein the machine learning unit performs machine learning by optimizing the plurality of first weights, the plurality of second weights, the threshold value of the plurality of second neurons, and the threshold value of the one or the plurality of third neurons.

12. The vibration type actuator control apparatus according to claim 10, wherein the machine learning unit performs machine learning by optimizing the plurality of first weights and the plurality of second weights set by a random function, the threshold value of the plurality of second neurons, and the threshold value of the one or the plurality of third neurons.

13. The vibration type actuator control apparatus according to claim 10, wherein the machine learning unit performs machine learning by optimizing the plurality of first weights and the plurality of second weights that are optimized, the threshold value of the plurality of second neurons, and the threshold value of the one or the plurality of third neurons.

14. The vibration type actuator control apparatus according to claim 10, further comprising a storage unit configured to store the plurality of first weights, the plurality of second weights, the threshold value of the plurality of second neurons, and the threshold value of the one or the plurality of third neurons included in the neural network, wherein the machine learning unit performs machine learning by replacing the plurality of first weights, the plurality of second weights, the threshold value of the plurality of second neurons, and the threshold value of the one or the plurality of third neurons included in the neural network, with the plurality of first weights, the plurality of second weights, the threshold value of the plurality of second neurons, and the threshold value of the one or the plurality of third neurons stored by the storage unit.

15. The vibration type actuator control apparatus according to claim 9, wherein the machine learning unit performs machine learning in cases other than a case of moving the contact member relative to the vibrator.

16. The vibration type actuator control apparatus according to claim 9, wherein the machine learning unit performs machine learning in a case of moving the contact member relative to the vibrator.

17. The vibration type actuator control apparatus according to claim 9, further comprising an environmental sensor configured to detect an environment condition, wherein the machine learning unit performs machine learning when the environmental sensor detects an environmental change.

18. The vibration type actuator control apparatus according to claim 17, wherein the environmental sensor is at least either one of a temperature sensor and a humidity sensor.

19. The vibration type actuator control apparatus according to claim 1, further comprising:

a velocity generation unit configured to generate the target velocity for moving the contact member relative to the vibrator; and a velocity detection unit configured to detect a detected velocity detected when the contact member is moved relative to the vibrator.

20. The vibration type actuator control apparatus according to claim 1, further comprising:

a position generation unit configured to generate the target position for moving the contact member relatively to the vibrator; and a position detection unit configured to detect the detected position detected when the contact member is moved relatively to the vibrator.

21. A vibration type driving apparatus comprising:

a vibration type actuator configured to move, by using a vibration produced in a vibrator, a contact member in contact with the vibrator relative to the vibrator; and a vibration type actuator control apparatus configured to control the vibration type actuator, wherein the vibration type actuator control apparatus includes a control unit including a first learned model and a second learned model each having a neural network including an input layer, a hidden layer, and an output layer, and a drive unit configured to move the contact member in contact with the vibrator relative to the vibrator by using control amounts output from the control unit, wherein, in a case where a target velocity for moving the contact member relative to the vibrator is input, the first learned model is configured to output a first control amount for moving the contact member relative to the vibrator, wherein, in a case where a positional deviation for moving the contact member relative to the vibrator is input, the second learned model is configured to output a second control amount for moving the contact member relative to the vibrator, wherein the drive unit is configured to move the contact member relative to the vibrator by using a value based on the first control amount and the second control amount, and wherein the positional deviation is a value in association with a difference between a target position for moving the contact member relatively to the vibrator and a detected position detected when the contact member is moved relatively to the vibrator.

22. An interchangeable lens comprising:

the vibration type driving apparatus according to claim 21; and a lens configured to be driven by moving the contact member relative to the vibrator.

23. An imaging apparatus comprising:

the vibration type driving apparatus according to claim 21; and an image sensor configured to be driven by moving the contact member relative to the vibrator.

24. An automatic stage comprising:

the vibration type driving apparatus according to claim 21; and a stage configured to be driven by moving the contact member relative to the vibrator.

* * * * *